(12) United States Patent
Tokuchi

(10) Patent No.: US 11,347,445 B2
(45) Date of Patent: May 31, 2022

(54) INFORMATION PROCESSING DEVICE AND NON-TRANSITORY COMPUTER READABLE MEDIUM STORING PROGRAM

(71) Applicant: FUJIFILM BUSINESS INNOVATION CORP., Tokyo (JP)

(72) Inventor: Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 192 days.

(21) Appl. No.: 16/421,942

(22) Filed: May 24, 2019

(65) Prior Publication Data
US 2019/0377521 A1 Dec. 12, 2019

(30) Foreign Application Priority Data

Jun. 8, 2018 (JP) .............................. JP2018-110028

(51) Int. Cl.
*G06F 3/12* (2006.01)
*G06F 3/16* (2006.01)
*H04L 51/04* (2022.01)
*G10L 15/22* (2006.01)

(52) U.S. Cl.
CPC .......... *G06F 3/1205* (2013.01); *G06F 3/1204* (2013.01); *G06F 3/1206* (2013.01); *G06F 3/1237* (2013.01); *G06F 3/167* (2013.01); *G10L 15/22* (2013.01); *H04L 51/04* (2013.01); *G10L 2015/223* (2013.01)

(58) Field of Classification Search
CPC ...... G06F 3/1205; G06F 3/1206; G06F 3/167; G06F 3/1204; G06F 3/1237; G06F 3/1285; G06F 3/1228; G06F 3/1268; G06F 3/1275; G06F 16/3329; G06F 9/451; H04L 51/04; H04L 51/02; H04L 67/12; G10L 15/22; G10L 2015/223
USPC ........................................................ 358/1.15
See application file for complete search history.

(56) References Cited

U.S. PATENT DOCUMENTS

| 7,853,661 | B2 | 12/2010 | Bristol et al. |
| 8,682,997 | B2 | 3/2014 | Bristol et al. |
| 2019/0140986 | A1* | 5/2019 | Anderson ............. H04L 67/104 |

FOREIGN PATENT DOCUMENTS

| JP | 2009-522687 A | 6/2009 |
| JP | 2015-026092 A | 2/2015 |
| JP | 2015-108867 A | 6/2015 |
| JP | 2017-120627 A | 7/2017 |

OTHER PUBLICATIONS

Mar. 8, 2022 Office Action issued in Japanese Patent Application No. 2018-110028.

* cited by examiner

*Primary Examiner* — Thierry L Pham
(74) *Attorney, Agent, or Firm* — Oliff PLC

(57) ABSTRACT

An information processing device includes a control unit that, when a user gives an instruction to multiple conversation partners in a conversational user interface, controls notification of a result of addressing the instruction.

22 Claims, 11 Drawing Sheets

FIG. 5

| DEVICE (ALL, PART) | SOFTWARE | OBJECT | DETAILS OF SINGLE FUNCTION |
|---|---|---|---|
| • MULTIFUNCTIONAL DEVICE A | | | • PRINT FUNCTION, SCAN FUNCTION, COPY FUNCTION, FACSIMILE FUNCTION, AND OTHERS |
| • PC (B) | | | • DISPLAY FUNCTION, COMMUNICATION FUNCTION, AND OTHERS |
| | • DOCUMENT CREATION SOFTWARE C | | • DOCUMENT CREATION FUNCTION, DOCUMENT DISPLAY FUNCTION, AND OTHERS |
| | • PASSWORD SETTING SOFTWARE D | | • PASSWORD SETTING FUNCTION |
| | | • DOCUMENT FILE E | • DOCUMENT CREATION FUNCTION, DOCUMENT DISPLAY FUNCTION, AND OTHERS |
| | | • ACCOUNTING FILE F | • EDIT FUNCTION, DISPLAY FUNCTION, AND OTHERS |
| ⋮ | ⋮ | ⋮ | ⋮ |

FIG. 6

| DEVICE (ALL, PART) | SOFTWARE | OBJECT | DETAILS OF CORPORATIVE FUNCTION |
|---|---|---|---|
| • MULTIFUNCTIONAL DEVICE A<br>• PC (B) | | | • SCAN TRANSFER FUNCTION<br>• PRINT FUNCTION |
| • DOOR OPENING AND CLOSING SENSOR G<br>• LIGHTING DEVICE H | | | • FUNCTION OF TURNING ON LIGHTING DEVICE IN RESPONSE TO DETECTION OF DOOR OPENING |
| | • DOCUMENT CREATION SOFTWARE C<br>• PASSWORD SETTING SOFTWARE D | | • FUNCTION OF SETTING PASSWORD TO DOCUMENT FILE |
| | • DOCUMENT CREATION SOFTWARE C<br>• DATA TRANSMISSION SOFTWARE J | | • FUNCTION OF TRANSMITTING DOCUMENT FILE |
| | | • DOCUMENT FILE E<br>• ACCOUNTING FILE F | • FUNCTION OF ADDING CONTENT OF DOCUMENT FILE TO ACCOUNTING FILE |
| • MULTIFUNCTIONAL DEVICE A | • CHARACTER RECOGNITION SOFTWARE K | | • FUNCTION OF APPLYING CHARACTER RECOGNITION PROCESSING TO SCANNED DOCUMENT |
| • SCANNER | • CHARACTER RECOGNITION SOFTWARE<br>• FORM CREATION SOFTWARE | • PAYMENT RECEIPT<br>• ACCOUNTING FILE | FUNCTION OF ADDING CONTENT OF PAYMENT RECEIPT TO ACCOUNTING FILE WHEN PAYMENT RECEIPT IS SCANNED |
| | • WEB BROWSER<br>• SHOPPING SITE<br>• PURCHASE INSTRUCTION | • BRAND NAME BAG<br>(TARGET FOR SHOPPING) | WHEN BRAND NAME BAG IS PRESENTED ON A SHOPPING SITE, THE BAG IS PURCHASED |
| ... | ... | ... | ... |

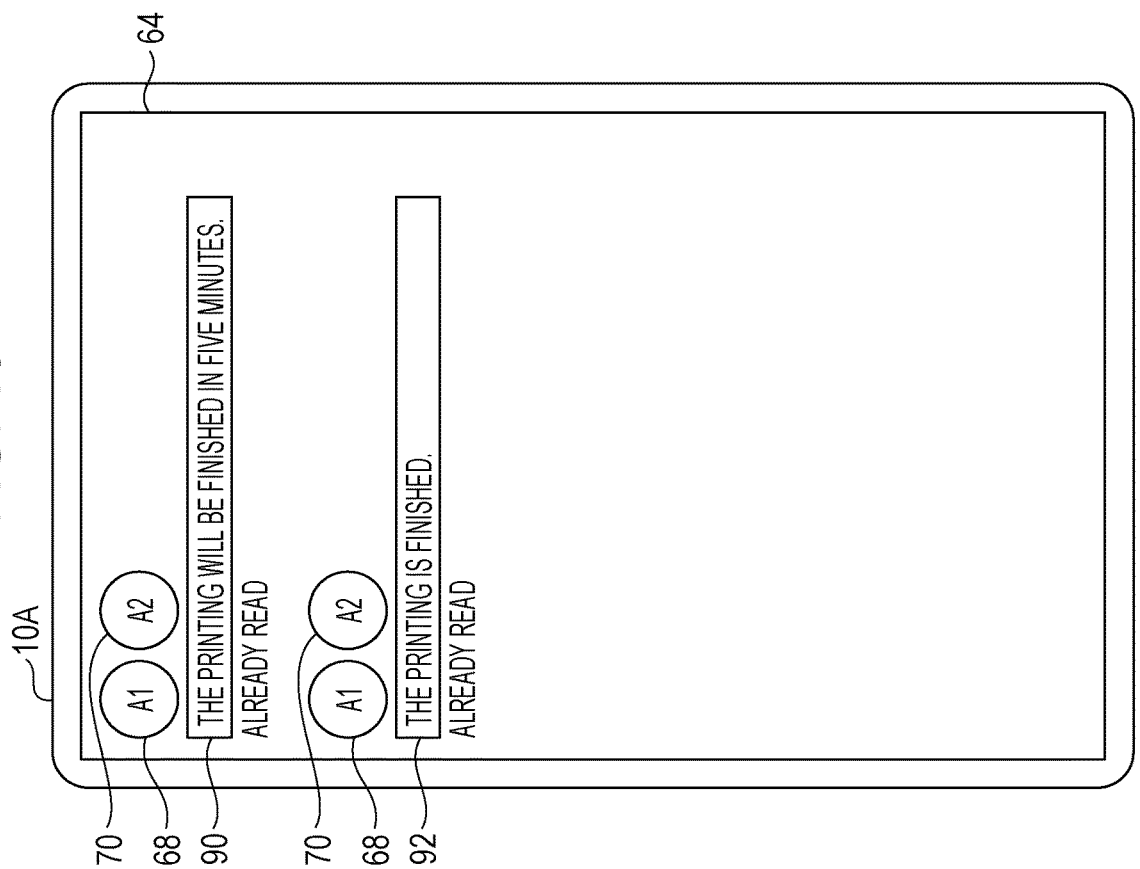
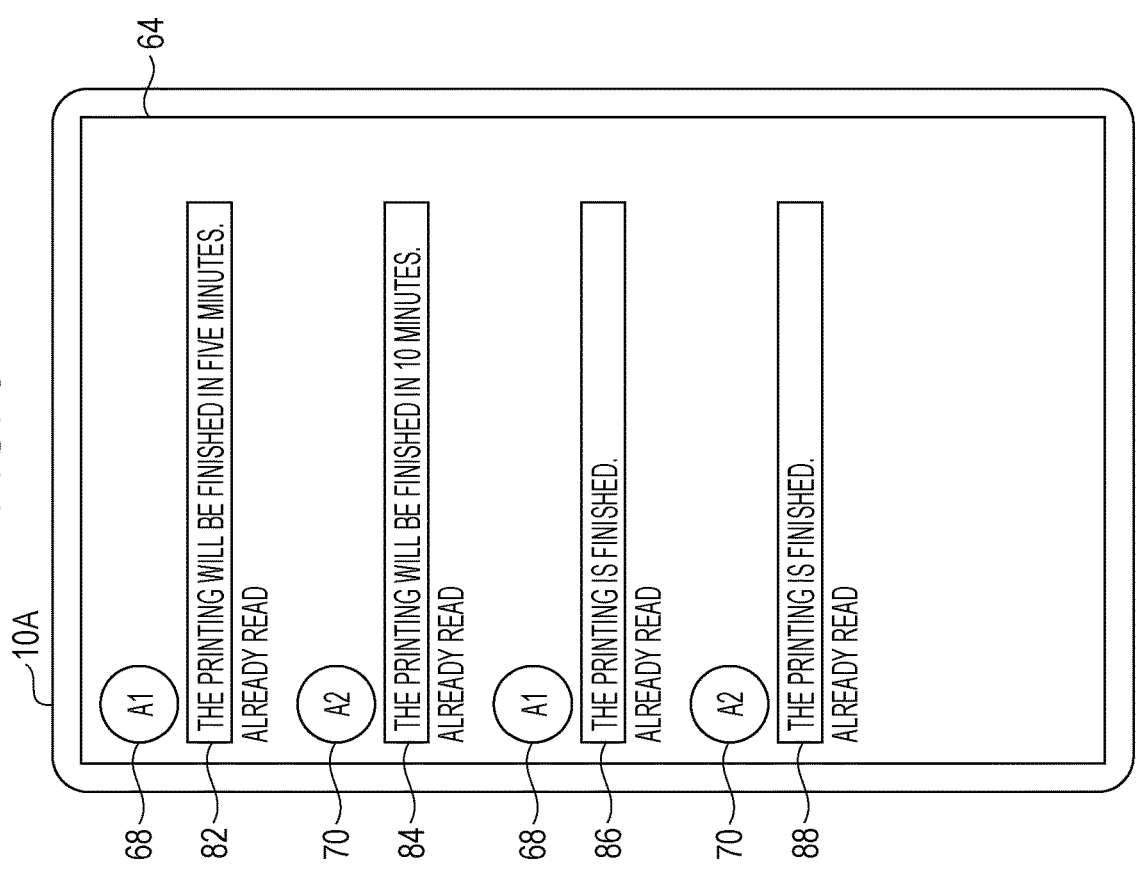

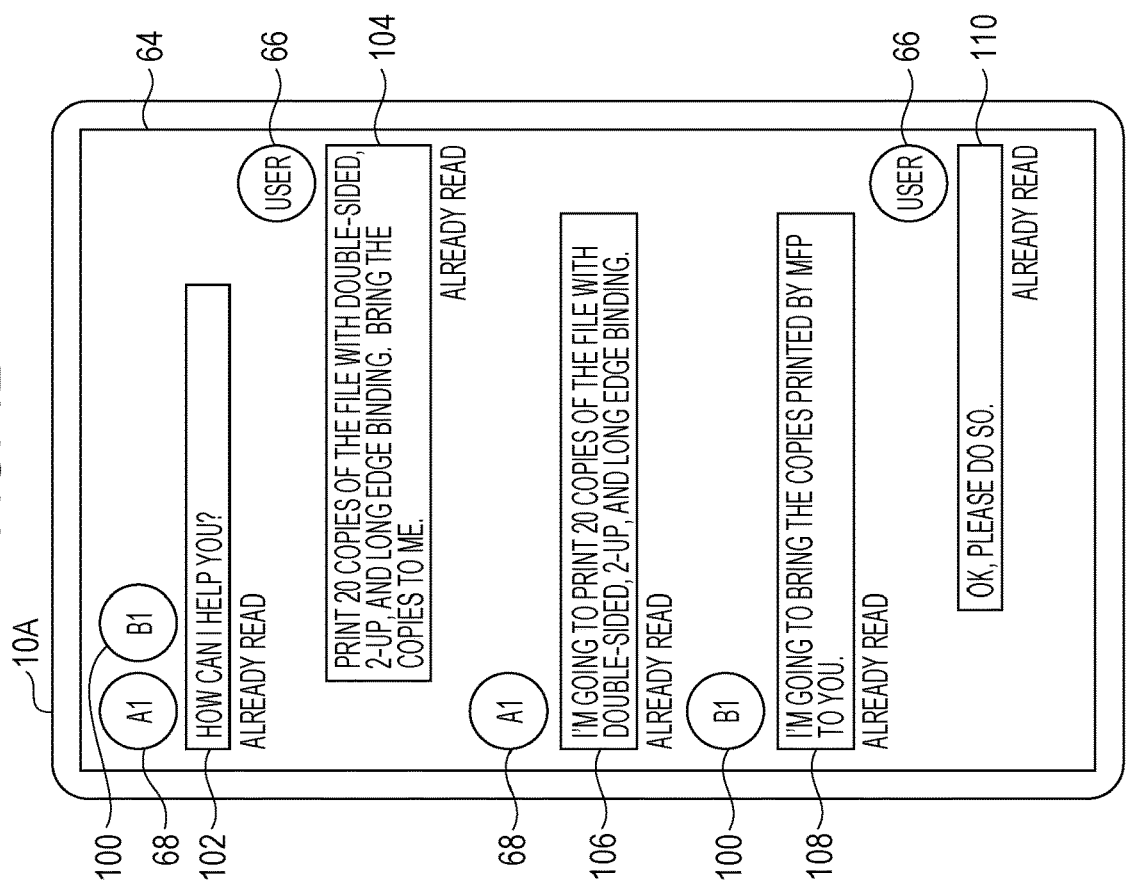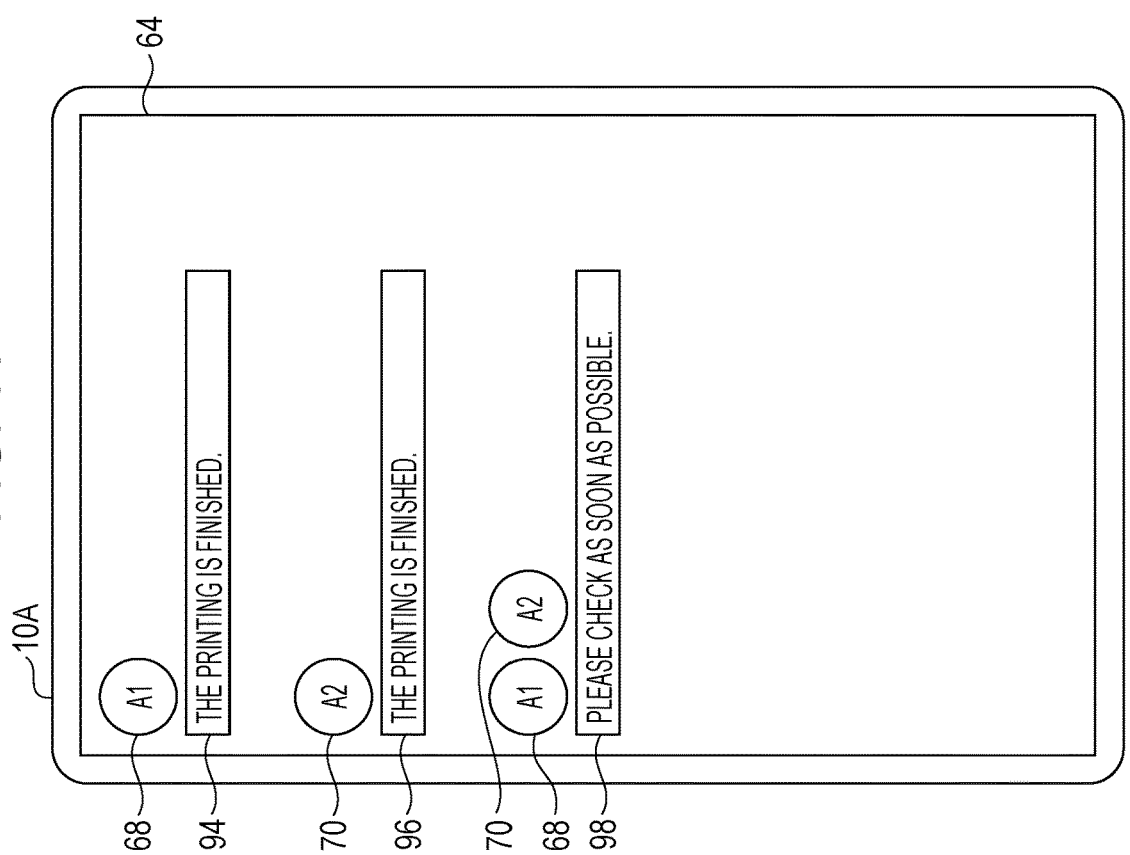

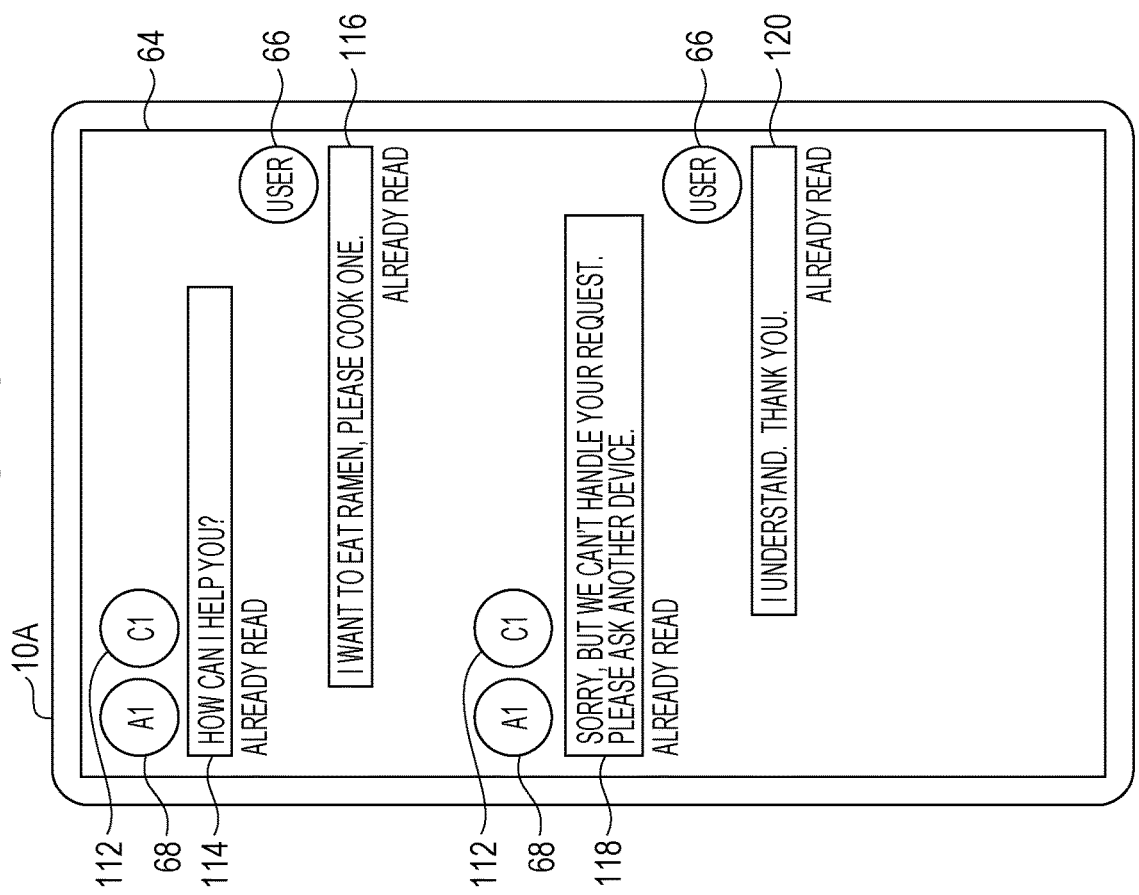

US 11,347,445 B2

INFORMATION PROCESSING DEVICE AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-110028 filed Jun. 8, 2018.

BACKGROUND

(i) Technical Field

The present disclosure relates to an information processing device and a non-transitory computer readable medium storing a program.

(ii) Related Art

Japanese Unexamined Patent Application Publication (Translation of PCT Application) No. 2009-522687 describes a method that establishes communication with one or more bots and enables remote interaction between a user and a device which is going to consume media via the one or more bots.

SUMMARY

Aspects of non-limiting embodiments of the present disclosure relate to a user interface for issuing an instruction to multiple conversation partners.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device including a control unit that, when a user gives an instruction to a plurality of conversation partners in a conversational user interface, controls notification of a result of addressing the instruction.

BRIEF DESCRIPTION OF THE DRAWINGS

Exemplary embodiments of the present disclosure will be described in detail based on the following figures, wherein:

FIG. 5 is a table illustrating a single function management table;

FIG. 6 is a table illustrating a cooperative function management table;

FIG. 9 is a view illustrating a screen;

FIG. 10 is a view illustrating a screen;

FIG. 11 is a view illustrating a screen;

FIG. 12 is a view illustrating a screen;

FIG. 13 is a view illustrating a screen;

FIG. 14 is a table illustrating a compatibility management table according to a modification;

DETAILED DESCRIPTION

Figure 1:
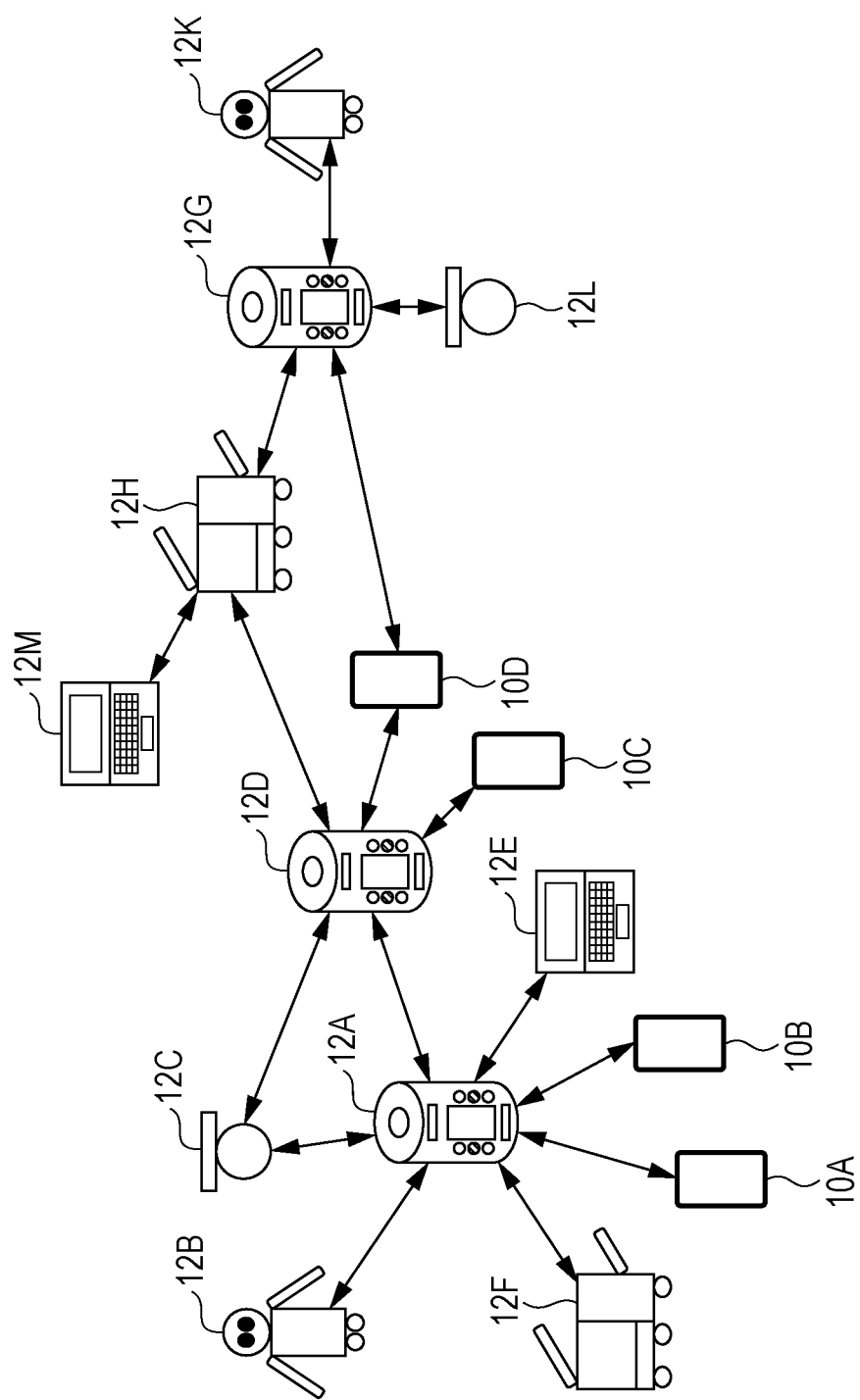
FIG. 1 is a block diagram illustrating the configuration of an information processing system according to an exemplary embodiment of the present disclosure.

An information processing system according to an exemplary embodiment of the present disclosure will be described with reference to FIG. 1. FIG. 1 illustrates an example of the information processing system according to the exemplary embodiment.

The information processing system according to the exemplary embodiment includes one or multiple terminal apparatuses and one or multiple devices. In the example illustrated in FIG. 1, the information processing system includes terminal apparatuses 10A to 10D and devices 12A to 12M. It is to be noted that these are only examples and server may be included in the information processing system. Hereinafter, when the terminal apparatuses do not need to be distinguished, each terminal apparatus is referred to as a "terminal apparatus 10". Similarly, when the devices do not need to be distinguished, each device is referred to as a "device 12". It is to be noted that the category of the concept of the device 12 may include the terminal apparatus 10. In other words, the terminal apparatus 10 may be treated as the device 12.

The terminal apparatus 10 and the device 12 have a function of communicating with other devices. The communication may be wireless communications or may be wired communication. For instance, the terminal apparatus 10 and the device 12 may communicate with other devices via a communication path such as the Internet or another network, may directly communicate with other devices, may communicate with other devices via a repeater which functions as a hub, or may communicate with other devices via a so-called cloud or a server. Each device 12 may be so-called an Internet of Things (IoT) device.

The terminal apparatus 10 is a device such as a personal computer (PC), a tablet PC, a smartphone, or a mobile phone, and has a function of communicating with other devices. The terminal apparatus 10 may be a wearable terminal (such as a wrist watch terminal, a wristband terminal, an eyeglass-type terminal, a finger ring terminal, a contact lens terminal, an implantable terminal, or an audible terminal). In addition, the terminal apparatus 10 may have a flexible display as a display. For instance, an organic electroluminescent display (a flexible organic EL display), an electronic paper display, or a flexible liquid crystal display is used as a flexible display. Any flexible display, which uses a display system other than those mentioned above, may be used. The flexible display is a display that has a display area which is flexibly deformable. For instance, bending, folding, winding, twisting, or stretching of the flexible display is possible. The entire terminal apparatus 10 may be configurated of a flexible display, or a flexible display and the components other than the flexible display may be functionally or physically separated.

The device 12 is a device having a function, for instance, an image forming device having an image forming function (such as a scan function, a print function, a copy function, a facsimile function), a personal computer (PC), a tablet PC, a smartphone, a mobile phone, a robot (such as a humanoid robot, an animal robot other than the humanoid human, robots other than these robots), a projector, a display device such as a liquid crystal display, a recording device, a reproduction device, an imaging device such as a camera, a refrigerator, a rice cooker, a microwave oven, a coffee brewer, a cleaner, a washing machine, an air conditioner, a lighting device, a clock, a monitoring camera, an automobile, a two-wheeled vehicle, an airplane (for instance, an unmanned aerial vehicle (so-called drone)), a game machine, and various sensing devices (for instance, a temperature sensor, a humidity sensor, a voltage sensor, and a current sensor). The device 12 may be a device (for instance, an image forming apparatus, or a PC) which outputs information to a user, or a device (for instance, a sensing device) which does not output information to a user. Also, all of the multiple devices 12 that perform the later-described cooperative functions may be devices which output information to a user, part of the devices 12 may be devices which output information to a user and the rest of the devices 12 may be devices which do not output information to a user, or all the devices 12 may be devices which do not output information to a user. The category of the concept of the device 12 may include all devices in general. For instance, information devices, video devices, audio devices, and other devices may be included in the category of the concept of the device 12.

The device 12 may perform a single function, or may cooperate with another device 12 to perform a cooperative function. A single function is a function which is implementable using one device 12, for instance. A cooperative function is a function which is implementable using multiple devices 12, for instance. In order to perform a single function and a cooperative function, for instance, hardware or software owned by the device 12 is used. When a device 12 is not in cooperation with other devices 12, the device 12 may independently receive an instruction from a user to perform a single function. It goes without saying that the device 12 (for instance, a sensing device) which performs a function without receiving an instruction from a user may be included in the information processing system.

Here, the cooperative function is described. The entire device 12, a specific part of the device 12, a specific function of software, or collective functions including multiple functions may be used for a cooperative function. For instance, when a function is assigned to each of the parts of the device 12, a cooperative function may use the parts. A specific example will be given. It is assumed that a print function is assigned to the main body of a multifunctional device having multiple image forming functions, a scan function is assigned to the reader (for instance, parts corresponding to a document covering part, a document glass, and an automatic document feeding device) of the multifunctional device, and a post-processing function (for instance, a staple function) is assigned to a post-processing device of the multifunctional device. In this case, the main body, reader, the reader or the post-processing device of the multifunctional device may be used for a cooperative function. Also, collective functions in block units as software like Robotics Process Automation (RPA) may be used for a cooperative function. Alternatively, when software has multiple functions, a cooperative function may use part of the multiple functions. Collective functions include multiple functions, which are executed concurrently or successively, thereby performing the processing of the collective functions. Also, the cooperative function may be a function that uses only hardware, may be a function that uses only software, or may be a function that uses both hardware and software. In addition, for a cooperative function, data such as an image file or a document file may be used, or the terminal apparatus 10 may be used.

The cooperative function may be a function implementable by coordinating cooperation between multiple devices 12 of different types, or may be a function implementable by coordinating cooperation between multiple devices 12 of the same type. The cooperative function may be a function which is not utilizable before cooperation between the multiple devices 12 is coordinated. For instance, a copy function is implementable as a cooperative function by coordinating cooperation between a device 12 (printer) which has a print function and a device 12 (scanner) which has a scan function. In short, a copy function is implementable by coordinating cooperation between a print function and a scan function.

The category of the concept of the cooperative function may include an incorporated function in which a new function is implementable by coordinating cooperation between the multiple devices 12. For instance, an extended display function may be implemented as an incorporated function by combining multiple displays. As another example, a recording function may be implemented as an incorporated function by combining a television and a recorder. The recording function is, for instance, a function of recording images displayed on a television. In addition, an image capturing area extending function may be implemented as an incorporated function by combining multiple cameras. The extending function is a function of capturing an image by connecting the image capturing areas of the cameras, for instance. In addition, a translation phone call function (a function of translating conversation through a telephone) may be implemented as an incorporated function by combining a telephone and a translator or translation software. Like this, the category of the concept of the cooperative function may include a function implementable by coordinating cooperation between multiple devices 12 of the same type or software, and a function implementable by coordinating cooperation between multiple devices 12 of different types or software.

In addition, a connected home (a system that connects devices 12 such as home electrical appliances by a network using IoT technology) may be constructed by multiple devices 12, and a cooperative function may be used in the connected home. In this the devices 2 may be coupled to each other through a specific server, or the devices 12 may be coupled to each other without passing through a specific server.

In addition, the multiple devices 12 may perform a cooperative function by coordinating cooperation between the multiple devices 12 using IF This Then That (IFTTT). In other words, the contents of a cooperative function may be such that when an event as a trigger occurs in a device 12, another device 12 performs an action (processing). For instance, a cooperative function of performing an action of turning on a lighting device as another device 12 may be performed triggered by detection of opening of a door by a sensor as a device 12. Also, a function of performing an action by still another device 12 triggered by an action of a device 12 may be included in the category of the concept of the cooperative function. In addition, a function of coordinating multiple Web services, and API coordination which coordinates multiple systems or services utilizing an application programming interface (API) may be included in the category of the concept of the cooperative function.

In the example illustrated in FIG. 1, devices 12A, 12D, and 12G are repeaters. The devices 12B, 12K are robots. The devices 12C, 12L are cameras. The devices 12E, 12N are PCs. The devices 12F, 12H are multifunctional devices each having an image forming function.

It is to be noted that a repeater may control, for instance, other devices 12 (for instance, the hardware included in the other devices 12, and software installed in the other devices 12) connected to the repeater. In addition, a repeater may obtain various types if information utilizing the Internet or the like. A repeater may function as a server, and may manage data and user information repeater may be a so-called smart speaker (a device having a communication function and a speaker function), or may be a device having a communication function but having no speaker function. A repeater may be installed indoors (for instance, the floor, ceiling of a room, or a table) or installed outdoors. A repeater may be a movable device (for instance, an automatic device).

Each device 12 is configured to perform a single function in accordance with an instruction of a user or automatically regardless of an instruction of a user. Also, each device 12 may perform a cooperative function which is set to the device 12 itself. For instance, setting information indicating the contents of a cooperative function is stored in each device 12 used for the cooperative function, and each device 12 performs the cooperative function indicated by the setting information stored in itself in cooperation with other devices 12.

One or multiple operation assistants (personal assistants) for assisting a user are mounted in each terminal apparatus 10 and each device 12. Each operation assistant is configurated to control, for instance, the terminal apparatus 10 or the device 12 in which the operation assistants are mounted. The operation assistant may control the hardware included in the terminal apparatus 10 or the device 12, or may control the software installed in the terminal apparatus 10 or the device 12. For instance, the operation assistant analyzes an instruction issued by a user, and controls the terminal apparatus 10 or the device 12 in accordance with the instruction, thereby controlling the execution of the function designated by the user. It goes without saying that a terminal apparatus 10 and a device 12, in which an operation assistant is not mounted, may be included in the information processing system.

Each operation assistant has a function of interacting with a user. For instance, the operation assistant serves as a chatbot (an automatic conversation program utilizing artificial intelligence) which is an auto response AI. In other words, the operation assistant exchanges information (for instance, messages) with a user by serving as a conversation partner of the user. For instance, the operation assistant (the chatbot) analyzes the utterance of a user, creates an answer based on a result of the analysis to provide the answer to the user. For instance, the answer is provided to a user as the utterance of the operation assistant.

When an instruction or an utterance of a user is given to the operation assistant by voice input or character input, the personal assistant analyzes the instruction of the utterance of the user by applying, for instance, natural language processing such as a morphological analysis to inputted information, and creates an answer based on a result of the analysis to provide the answer to the user.

An operation assistant (a chatbot) is achieved, for instance, by executing an operation assistant program (a chatbot program). The operation assistant program is installed in each terminal apparatus 10 and each device 12. It goes without saying that the operation assistant program may be installed in an external apparatus such as a server, and the functions of the operation assistant may be provided to the terminal apparatus 10 and the device 12 from the server.

The operation assistant may be achieved by artificial intelligence (AI). For instance, the operation assistant may have a learning function using artificial intelligence, and may have ability to make decision almost like a human by the learning function. Alternatively, a neural network deep learning may be utilized, enrichment learning, in which particular learning field is enriched, may be utilized, and in addition, a genetic algorithm, a cluster analysis, a self-organization map, and ensemble learning may be utilized. It goes without saying that a technique related to artificial intelligence other than those may be utilized.

The operation assistant may operate in accordance with instructions from a user associated with a user account which has logged in the operation assistant.

Figure 2:
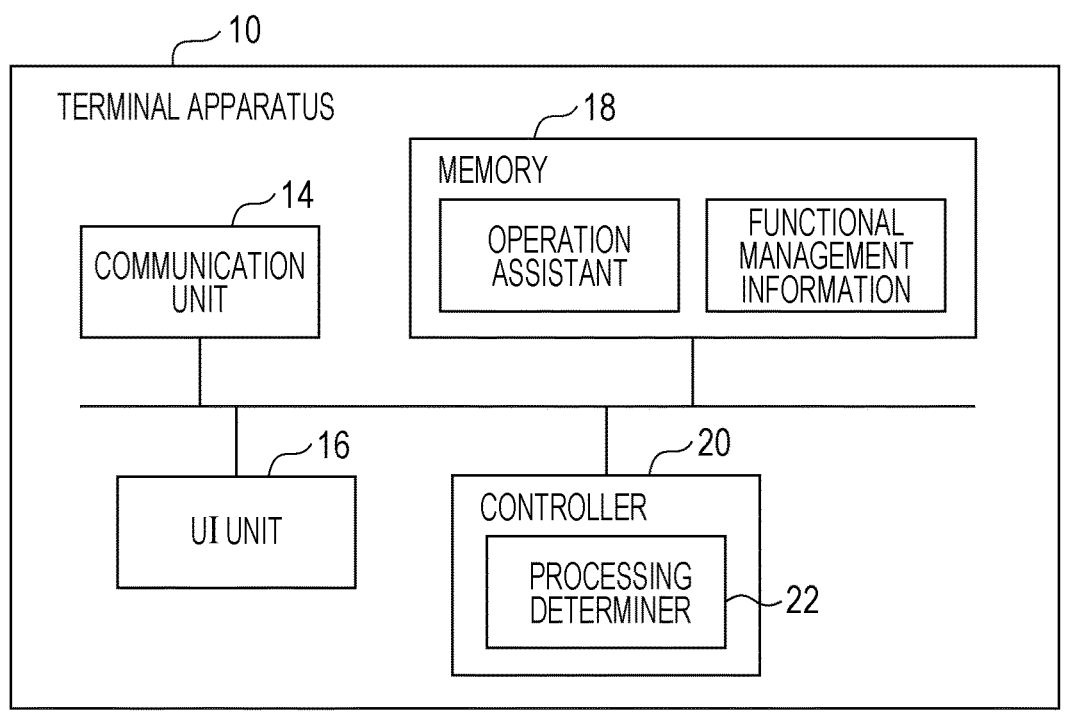
FIG. 2 is a block diagram illustrating the configuration of a terminal apparatus.

Hereinafter, the configuration of the terminal apparatus 10 will be described in detail with reference to FIG. 2. FIG. 2 illustrates the configuration of the terminal apparatus 10.

A communication unit 14 is a communication interface, and has functions of transmitting data to other devices and receiving data from other devices. The communication unit 14 may be a communication interface having a wireless communication function, or a communication interface having a wired communication function. The communication unit 14 supports, for instance one or multiple types of communication system, and may communicate with a communication partner in accordance with a communication system suitable for the communication partner (in other words, a communication system supported by the communication partner). The communication system includes, for instance, infrared ray communication, visible light communication, Wi-Fi (registered trademark) communication, and proximity wireless communication (for instance, Near Field Communication (NFC)). As the proximity wireless communication, Felica (registered trademark), Bluetooth (registered trademark), or Radio Frequency identifier (RFID) is used. Also, the communication unit 14 may support the 5th generation mobile communication system (5G). It goes without saying that another wireless communication system may be used as the proximity wireless communication. The communication unit 14 may change a communication system and/or a frequency band according to a communication partner or according to the surrounding environment. For instance, 2.4 GHz or 5 GHz may be used as the frequency band.

An UI unit 16 is a user interface unit, and includes a display and an operation unit. The display is a display device such as a liquid crystal display. The display may be a flexible display. The operation unit is an input device such as a touch panel or a keyboard. The UI unit 16 may be a user interface (including, for instance, a touch display, and a device which electronically displays a keyboard on a display) serving as both a display and an operation unit. Also, the UI unit 16 may include a sound collector such as a microphone and a sound generator such as a speaker. In this case, information may be inputted to the terminal apparatus 10 by voice input, and information may be outputted by voice.

A storage 18 is a storage device such as a hard disk or a memory (for instance, an SSD). In the storage 18, for instance, various types of data and various types of programs (software) are stored. As the programs, for instance, an operating system (OS), and various types of application programs (software) are stored. As an example of application programs, one or multiple operation assistant programs (chatbot programs) are stored in the storage 18. Functional management information is also stored in the storage 18. In addition, the storage 18 may store device address information (for instance, an IP address or a MAC address assigned to each device 12) indicating the address of the device 12, and server address information (for instance, an IP address or a MAC address assigned to a server) indicating the address of a server.

Hereinafter, the functional management information will be described in detail. The functional management information is information for managing one or multiple functions implementable by using the device 12. For instance, the functional management information is generated advance and stored in the storage 18. The function may be a single function or a cooperative function.

The functional management information is information indicating association between device identification information for identifying the device 12 and functional data showing the contents of the functions performed using the device 12, for instance. For instance, device identification information of a device 12 used for a single function, and functional data indicating the contents of the single function are associated with each other, and registered in the functional management information. In addition, information (a combination of pieces of device identification information of those devices 12) indicating a combination of multiple devices 12 used for a cooperative function, and functional data indicating the contents of the cooperative function are associated with each other, and registered in the functional management information.

The device identification information is, for instance, the name, device ID of a device 12, information indicating the type of a device 12, the model number of a device 12, information (for instance, asset management information) for managing a device 12, information (positional information on the device 12) indicating a position at which the device 12 is installed, an image (device image) associated with a device 12, or device address information. The device image is, for instance, an appearance image which represents a device 12. The appearance image may be an image which represents the outside (for instance, the housing of a device 12) of a device 12, may be an image which represents a state (for instance, an internal structure) where the housing is opened and the inside can be viewed from the outside, or may be an image which represents a state where a device 12 is covered with a packing sheet. The device image may be an image (an image showing the appearance or an image showing the inside of a device 12) generated by capturing a device 12 with an image capture device such as a camera, or may be an image (for instance, an icon) which schematically represents a device 12. The device image may be a still image and may be a dynamic image. The data of a device image may be stored in the storage 18 or may be stored in another device (such as a device 12 or a server).

In addition, the functional management information may include information indicating the performance of a device 12, and information indicating the status of a device 12. The performance is, for instance, the performance of a processor such as a CPU, the capacity of a memory, and installed software. The information indicating the status shows, for instance, during an operation, during stop, during a failure, during a sleep mode, or during processing.

It is to be noted that the functional management information may be stored in a device (such as a device 12 or a server) other than the terminal apparatus 10. In this case, the functional management information does not need to be stored in the terminal apparatus 10.

When software is used for a cooperative function, software identification information for identifying the software is registered in the functional management information. For instance, when a cooperative function is achieved by coordinating cooperation between a device 12 and software, a combination of device identification information of the device 12 and software identification information of the software, and functional data indicating the contents of the cooperative function are associated with each other, and registered in the functional management information. It is to be noted that a cooperative function may be achieved without using any device 12. For instance, when a cooperative function is achieved by using multiple pieces of software, a combing f pieces of software identification information of the multiple pieces of software, and functional data indicating the contents of the cooperative function are associated with each other, and registered in the functional management information. Also, a file (data) or a physical object may be used for a cooperative function. In this case, information for identifying the file or the object registered in the functional management information in association with functional data indicating the contents of the cooperative function. For instance, when a cooperative function is achieved by using a device 12 and a file, a combination of device identification information of the device 12 and identification information of the file, and functional data indicating the contents of the cooperative function are associated with each other, and registered in the functional management information. The same goes with when a cooperative function is achieved by using software and a file in this manner, a cooperative function may be achieved by a combination of multiple devices 12, a combination of multiple pieces of software, a combination of a device 12 and software, a combination of a device 12 and a file or object, or a combination of software and a file or object.

When a new device 12 is added to the information processing system, any single function of the device 12, and a cooperative function implementable by coordinating cooperation between the device 12 and other devices 12 is registered in the functional management information. The registration processing may be performed by the terminal apparatus 10, may be performed by the device 12, or may be performed by an apparatus such as a server.

A controller 20 is configured to control the operation of each component of the terminal apparatus 10. For instance, the controller 20 performs execution of a program, control of communication performed by the communication unit 14, control of notification (for instance, display and voice output of information) of information using the UI unit 16, receiving of information inputted to the terminal apparatus 10 using the UI unit 16, writing of information to the storage 18, and reading of information from the storage 18. The controller 20 includes a processing determiner 22.

The processing determiner 22 analyzes the processing included in the contents of an instruction given by a user, and determines devices 12 by which the individual processing included in the processing is to be performed. For instance, the processing determiner 22 refers to the functional management information stored in the storage 18, identifies the devices 12 which have respective functions used for performing the individual processing, and assigns the individual processing to the devices 12. The processing determiner 22 transmits information indicating an execution command of each individual processing to a corresponding device 12, and the device 12 performs the individual processing assigned to the device 12 in accordance with the execution command. For instance, information is exchanged between an operation assistant (a chatbot) mounted in the device 12 and a user, and thus information indicating an execution command is given to the operation assistant. The operation assistant controls the device 12, in which the operation assistant is mounted, in accordance with the execution command, thereby causing the device 12 to perform the individual processing.

Figure 3:
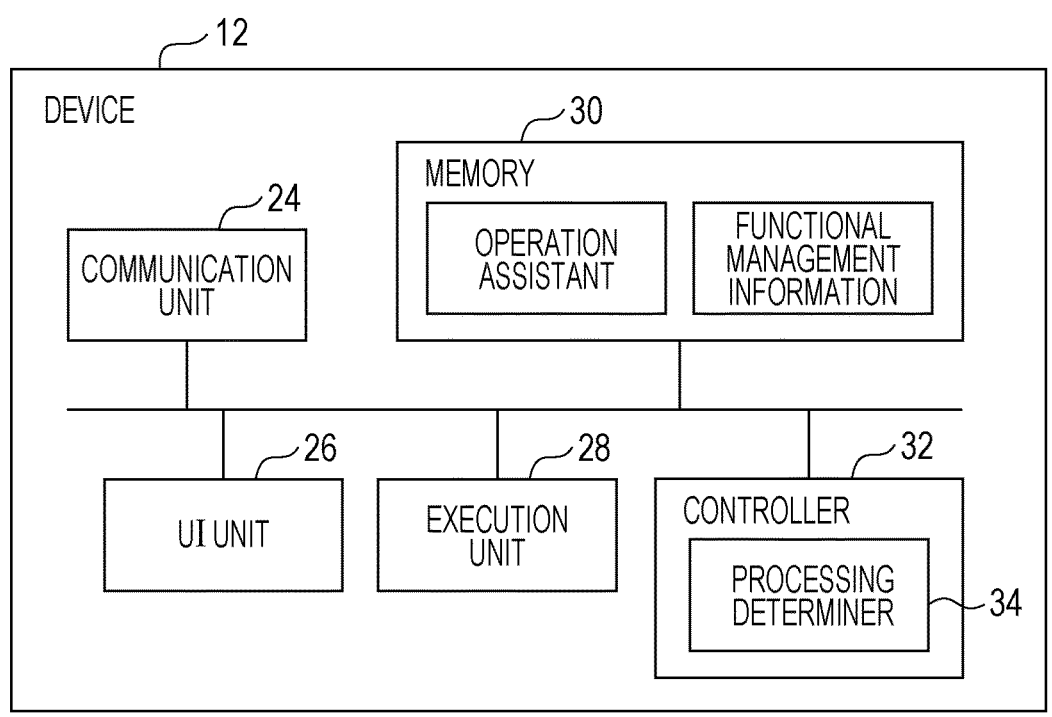
FIG. 3 is a block diagram illustrating the configuration of a device.

Hereinafter, the configuration of the device 12 will be described in detail with reference to FIG. 3. FIG. 3 illustrates an example of the configuration of the device 12. It is to be noted that FIG. 3 illustrates the configuration which is shared in common by the devices 12, and does not illustrate a specific configuration of each device 12.

A communication unit 24 is a communication interface, and has functions of transmitting data to other devices and receiving data from other devices. The communication unit 24 may be a communication interface having a wireless communication function, or a communication interface having a wired communication function. The communication unit 24 supports, for instance one or multiple types of communication system, and may communicate with a communication partner in accordance with a communication system suitable for the communication partner. The above-described communication systems may be used as the communication system. The communication unit 24 may change a communication system and/or a frequency band according to a communication partner or according to the surrounding environment.

A UI unit 26 is a user interface unit, and includes a display and an operation unit. The display is a display device such as a liquid crystal display. The display may be a flexible display. The operation unit is an input device such as a touch panel or a keyboard. The UI unit 26 may be a user interface serving as both a display and an operation unit. Also, the UI unit 26 may include a sound collector such as a microphone and a sound generator such as a speaker. In this case, information may be inputted to the device 12 by voice input, and information may be outputted by voice. The information processing system may include a device 12 which has no UI unit 26. For instance, a sensing device, which outputs no information to a user, does not need to have the UI unit 26.

An execution unit 28 is configurated to execute functions. For instance, when the device 12 is an image forming device, the execution unit 28 executes an image forming function. When the device 12 is a robot, the execution unit 28 executes the functions owned by the robot (for instance, a moving function and a lifting function). When the device 12 is a camera, the execution unit 28 executes an image capturing function.

A storage 30 is a storage device such as a hard disk or a memory (for instance, an SSD). In the storage 30, for instance, various types of data and various types of programs (software) are stored. As the programs, for instance, an OS, and various types of application programs (software) are stored. As an example of application programs, one or multiple operation assistant programs (chatbot programs) are stored in the storage 30. It is to be noted that an OS and application programs may not be stored in the storage 30 depending on the device 12. In addition, the storage 30 may store device address information (for instance, an IP address or a MAC address assigned to each of other devices 1.2) indicating the address of each of the other devices 12, terminal address information (for instance, an IP address or a MAC address assigned to each of the terminal apparatuses 10) indicating the address of each of the terminal apparatuses 10, and server address information (for instance, an IP address or a MAC address assigned to each of servers) indicating the address of each of the servers. Also, the storage 30 stores the functional management information. For instance, similarly to the functional management information stored in the terminal apparatus 10, the functional management information in the storage 30 indicates single functions and cooperative functions implementable using the devices 12.

The functional management information may be shared by the terminal apparatuses 10 and the devices 12. For instance, when a new function is added to a device 12, functional data regarding the function is newly registered in the functional management information stored in the device 12, the device identification information of the device 12 and the functional data are further transmitted to the terminal apparatuses 10 and the other devices 12, and registered in the functional management information stored in each of the terminal apparatuses 10 and the other devices 12.

A controller 32 is configured to control the operation of each component of the terminal apparatus 10. For instance, the controller 32 performs execution of a program, control of communication performed by the communication unit 24, control of notification (for instance, display and voice output information) of information using the UI unit 26, receiving of information inputted to the device 12 using the UI unit 16, control of the execution unit 28, writing of information to the storage 30, and reading of information from the storage 30. Also, the controller 32 includes a processing determiner 34.

Similarly to the processing determiner 22 included in the terminal apparatus 1, the processing determiner 34 analyzes the processing included in the content of instruction given by a user, and determines devices 12 by which the individual processing included in the processing is to be performed. For instance, the processing determiner 34 refers to the functional management information stored in the storage 30, identifies the devices 12 which have respective functions used for performing the individual processing, and assigns the individual processing to the devices 12. It is to be noted that the processing determiner 34 may be achieved by an operation assistant (a chatbot) mounted in the device 12. The same goes with the controller 32.

In the exemplary embodiment, individual processing is assigned to a device 12 by one of the processing determiner 22 included in the terminal apparatus 10 or the processing determiner 34 included in the device 12. It goes without saying that the processing determiners 22, 34 may cooperate to assign individual processing to a device 12. Alternatively, a processing determiner may be provided in an external apparatus such as a server, and individual processing may be assigned to each device 12 by the processing determiner.

Figure 4:
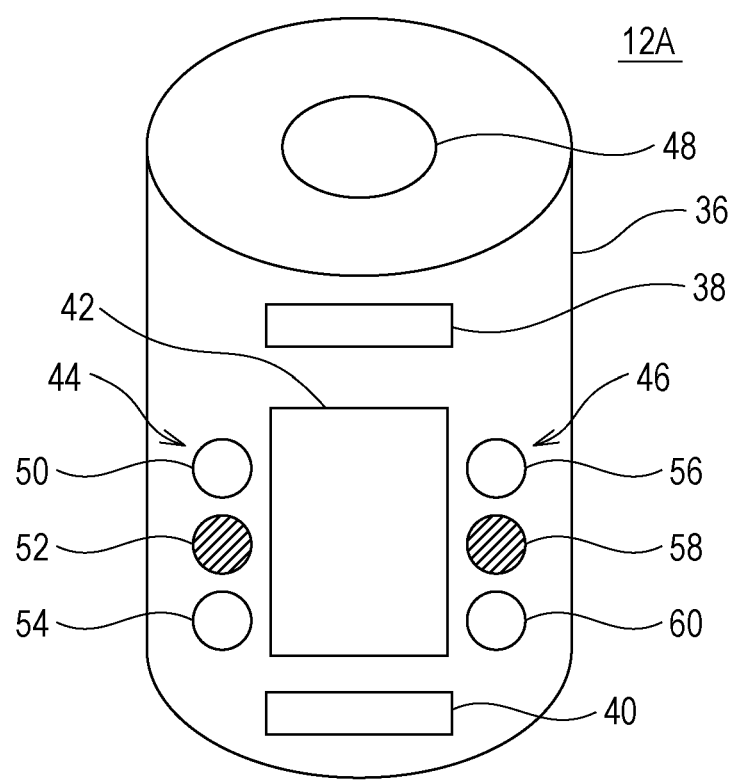
FIG. 4 is a perspective view illustrating the appearance of a repeater.

Hereinafter, the appearance of a repeater will be described in detail with reference to FIG. 4. FIG. 4 is a perspective view illustrating a repeater. As an example, FIG. 4 illustrates a device 12A as a repeater. The devices 12D, 12G may have the same configuration as that of the device 12A or may have different configuration from that of the device 12A.

The device 12A is a so-called smart speaker, and has a communication function and an assist function using voice. The device 12A includes a pillar-shaped main body 36. The lateral surface of the main body 36 is provided with a microphone 38, a speaker 40, a display 42, and light emitters 44, 46. Also, the upper surface of the main body 36 is provided with a sensor 48. It is to be noted that the shape of the main body 36 is not limited to the shape illustrated in FIG. 4. As long as a repeater includes the microphone 38 and the speaker 40, the repeater may have any shape. Also, the microphone 38, the speaker 40, the display 42, the light emitters 44, 46, and the sensor 48 may be disposed at positions other than the positions illustrated in FIG. 4.

The microphone 38 functions as a sound collecting device, and collects sound around the device 12A. For instance, voice of users is collected by the microphone 38.

When a user is interacting with an operation assistant (a chatbot) mounted in the device 12A, the content of an utterance of the operation assistant is outputted from the speaker 40 as the voice. Also, music, the sound of a television, and the sound of a radio may be outputted from the speaker 40.

The display 42 is a display device. The display 42 may be a user interface (for instance, a touch panel) which also serves as an operation unit.

The light emitter 44 includes one or multiple light sources (for instance, light sources 50, 5, and 54), and emits light in accordance with an emission manner according to the setting of the operation assistant mounted in the device 12A. For instance, age, sex, occupation, and/or character are set to the operation assistant as setting items. The operation assistant answers to a user and performs a task in accordance with the setting items. For instance, when doctor is set as the occupation setting item, the light sources 50, 54 emit blue light, and the light source 52 emits yellow light. When another setting item is set, the light emitter 44 emits light in accordance with an emission manner according to the setting.

A light emitter 46 includes one or multiple light sources (for instance, light sources 56, 58, and 60), and emits light in accordance with an emission manner according to a user account which logs in the operation assistant mounted in the device 12A. For instance, when a user logs in the operation assistant mounted in the device 12A, the light sources 56, 60 emit blue light, and the light source 58 emits yellow light. When another user logs in the operation assistant, the light emitter 46 emits light in accordance with an emission manner according to the another user.

The light emitters 44, 46 may be provided in the main body 36 without being distinguished. For instance, the content of setting of the operation assistant and the user account may be represented using all light sources included in the light emitters 44, 46. Also, the content of setting of the operation assistant and the user account may be represented by a light emission pattern (for instance, a blinking manner, a time length) of each light source.

The sensor 48 detects, for instance, a gesture of a user. The device 12 performs processing in accordance with the detected gesture. For instance, the device 12A may perform processing by itself in accordance with the detected gesture, or may control the operation of another device 12.

Hereinafter, the functional management information will be described in detail with reference to FIGS. 5 and 6. FIG. 5 illustrates an example of a single function management table as the functional management information. FIG. 6 illustrates an example of a cooperative functional management table as the functional management information. The single functional management table and the cooperative functional management table may be created as separate tables or created as a single table. Hereinafter, the single functional management table will be first described with reference to FIG. 5, and subsequently the cooperative functional management table will be described with reference to FIG. 6.

In the single functional management table illustrated in FIG. 5, as an example, a device 12, identification information for identifying software or an object, and functional data indicating the contents of a single function are associated with each other. All or part of the device 12 may be used or a specific function of software may be used. The object is a file or physical object to which a function is applied. Each of the device 12, software, and object may be identified by information at a subordinate concept level (for instance, specific names (for instance, a specific product name, a commodity name, model number, Website name, URL)), or may be identified by information at a superordinate concept level (for instance, a generic name or a common name). Hereinafter, the single functions will be described.

A multifunctional device A as the device 12 has functions including a print function, a scan function, a copy function, and a facsimile function as the single functions. A PC (B) as the device 12 has functions including a display function and a communication function as the single functions. Document creation software C has functions including a document creation function and a document display function as the single functions. The document creation function is a function for creating or editing a document file. The document display function is a function for displaying a document file. Password setting software D has a function of setting a password to a file as the single function. A document file E is associated with functions including a document creation function and a document display function as the single functions. In other words, the document file B is associated with document creation software, and the functions owned by the document creation software are applied to the document file E. An accounting file F is associated with functions including an edit function and a display function as the single functions. In other words, the accounting file F is associated with accounting software, and the functions owned by the accounting software are applied to the accounting file F.

The software and files registered in the single functional management table may be stored in the terminal apparatus 10, may be stored in the device 12, or may be stored in an apparatus such as a server. The single function illustrated in FIG. 5 is only an example, and a single function other than above-mentioned single functions may be registered in the single functional management table.

Hereinafter, the cooperative functional management table will be described with reference to FIG. 6. In the cooperative functional management table, as an example, information indicating a combination of devices 12 and functional data indicating the contents of a cooperative function are associated with each other. Hereinafter, the cooperative functions will be described.

Cooperation between the multifunctional device A and the PC (B) as the devices 12 is coordinated, thereby making it possible to perform a "scan transfer function" and a "print function" as cooperative functions. The scan transfer function as a cooperative function is a function of transferring image data generated by scanning with the multifunctional device A to the PC (B). The print function as a cooperative function provides functions of transmitting data (such as a document file or an image file) stored in the PC (B) to the multifunctional device A and printing the data by the multifunctional device A.

Also, cooperation between a door opening and closing sensor G and a lighting device H as the devices 12 is coordinated, thereby making it possible to perform "a function of turning on a lighting device when opening of a door is detected" as a cooperative function. The door opening and, closing sensor G is a sensor that detects opening and closing of a door. The cooperative function is a function of turning on the lighting device H when opening of a door is detected by the door opening and closing sensor G. As more particularly described below, when the door opening and closing sensor G detects opening of a door, information indicating a result of the detection is transmitted from the door opening and closing sensor G to the lighting device H, and the lighting device H is turned on. The information may be directly transmitted from the door opening and closing sensor G to the lighting device H, or may be transmitted through a terminal apparatus 10 or a repeater. Alternatively, when a terminal apparatus 10 or a repeater receives information indicating a result of the detection, the lighting device H may be turned on by transmitting control information indicating a lighting instruction to the lighting device H. It is to be noted that the device address information of each of the door opening and closing sensor G and the lighting device H is stored in the terminal apparatus 10 and each device 12, and information is transmitted by using those pieces of the device address information.

Software is used for a cooperative function, and information indicating a combination of software and functional data indicating the contents of the cooperative function may be registered in the cooperative functional management table in association with each other. For instance, cooperation between the document creation software C and the password setting software D is coordinated, thereby making it possible to perform "a function of setting a password to a document file" as a cooperative function. The cooperative function is a function of setting a password by the password setting software D to a document file during edition or during display by the document creation software C, for instance. Also, cooperation between the document creation software C and data transmission software J is coordinated, thereby making it possible to perform "a function of transmitting a document file" as a cooperative function. The cooperative function is a function of transmitting a document file to a destination by the data transmission software J, the document file being during edition or during display by the document creation software C. It is to be noted that software registered in the cooperative functional management table may be installed in the terminal apparatus 10, may be installed in the device 12, or may be installed in an external apparatus such as a server.

Files are used for a cooperative function, and information indicating a combination of files and functional data indicating the contents of the cooperative function may be registered in the cooperative functional management table in association with each other. For instance, "a function of adding the contents of a document file to an accounting file" is registered as a cooperative function to be applied to the document file E and the accounting file F. It is to be noted that software registered in the cooperative functional management table may be stored in the terminal apparatus 10, may be stored in the device 12, or may be stored in an external apparatus such as a server.

A cooperative function may be achieved by a combination of a device 12 and software. For instance, cooperation between the multifunctional device A and character recognition software K is coordinated, thereby making it possible to perform "a function of applying character recognition processing on a scanned document" as a cooperative function. The cooperative function provides functions of scanning a document by the multifunctional device A, and applying character recognition processing by the character recognition software K to an image generated by the scanning.

A cooperative function may be achieved using a device 12, software, and a file. For instance, cooperative functions implementable by using a scanner, character recognition software, form creation software, a receipt, and an accounting file as the devices 12 are registered in the cooperative functional management table. The cooperative function provides "functions of applying character recognition processing to a result of scanning of a receipt, and adding the result (the contents of the receipt) to an accounting file". As more particularly described below, the cooperative function provides functions of scanning a receipt by a scanner, applying character recognition processing by character recognition software to image data generated by the scanning to extract a character string from the image data, and adding the character string to an accounting file by form creation software.

As still another example, cooperative functions implementable by using a Web browser, a specific shopping site, information indicating a purchase instruction, and a specific brand name bag as a target (shopping target) are registered in the cooperative functional management table. The cooperative function is "a function of purchasing a specific brand name bag when a web browser starts and the specific brand name bag is presented on a specific shopping site". As more particularly described below, the cooperative function provides functions of monitoring a specific shopping site by a Web browser, and when a specific brand name bag is presented on the shopping site, performing processing to purchase the brand name bag.

The cooperative functions illustrated in FIG. 6 are only an example, and a cooperative function other than the above-mentioned cooperative functions may be registered in the cooperative functional management table.

It is to be noted that a device 12 which performs a function may be controlled by the terminal apparatus or may be controlled by a repeater such as the device 12A. When the device 12 is controlled by the terminal apparatus 10, the terminal apparatus 10 transmits a control signal for controlling the operation of the device 12 to the device 12 directly or via a repeater, thereby controlling the device 12. When the device 12 is controlled by a repeater, the repeater transmits a control signal to the device 12, thereby controlling the device 12. A repeater may transmit a control signal to another repeater, and the another repeater may control the device 12. A control signal may be transmitted from a repeater to a server which may con the device 12.

In the exemplary embodiment, multiple devices 12 for performing processing (for instance, cooperative functions) included in the contents of an instruction given by a user are selected by a user. Then, information is exchanged between a user and each chatbot (each operation assistant) mounted in each device 12, thus the contents of an instruction are given to each chatbot, each device 12 is controlled in accordance with the contents of the instruction, and the processing is performed. It is to be noted that the chatbot mounted in each device 12 corresponds to an example of a conversation partner of a user. Hereinafter, the processing according to the exemplary embodiment will be described in detail.

Figure 7:
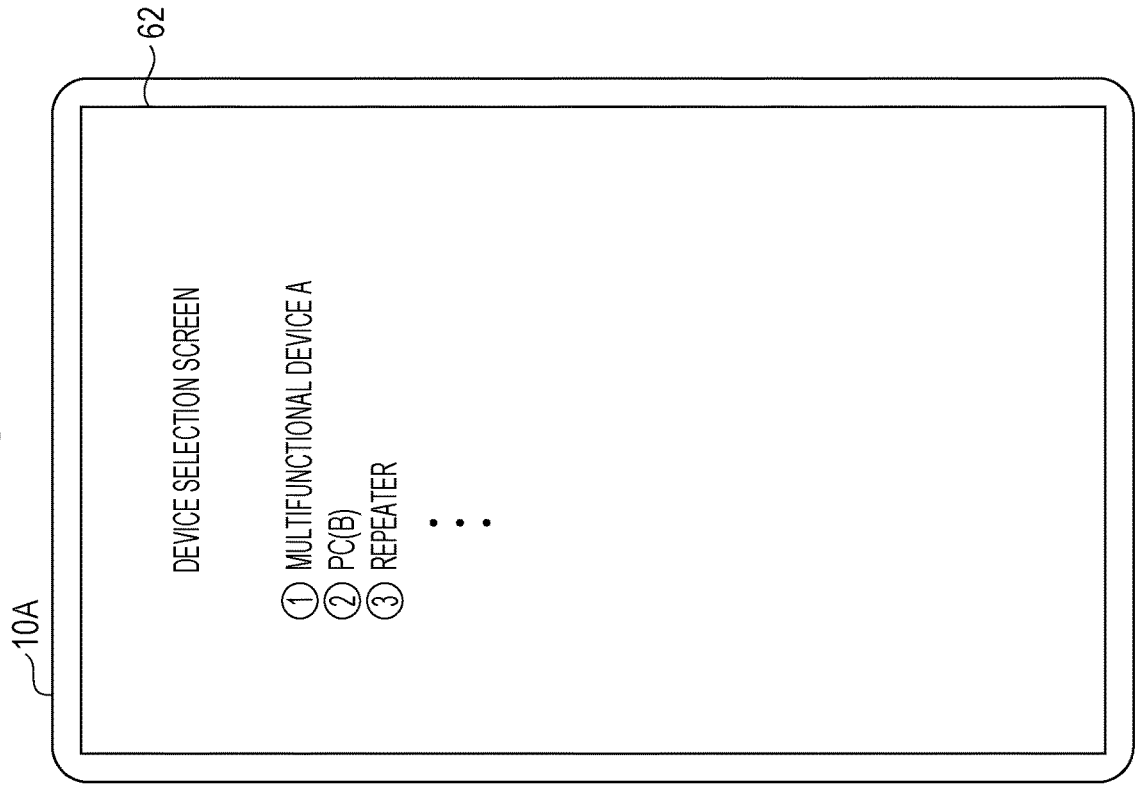
FIG. 7 is a view illustrating a screen.

The screen for selecting multiple devices 12 to perform a cooperative function will be described with reference to FIG. 7. FIG. 7 illustrates an example of the screen. The controller 20 of the terminal apparatus 10A displays a screen 62 on the display of the UI unit 16 in accordance with an instruction of a user. The screen 62 is for selecting multiple devices 12 that perform the processing. Devices 12 are selected on the screen 62, thus the chatbot mounted in each of the devices 12 is selected as a conversation partner. For instance, a list of the devices 12 included in the information processing system is displayed on the screen 62. For instance, when a user selects the multifunctional device A on the screen 62, a chatbot mounted in the multifunctional device A is selected as a conversation partner of the user. It is to be noted that the performance and status of each device 12 may be displayed on the screen 62. Alternatively, instead of the list of the devices 12 or along with the list of the devices 12, a list of chatbots mounted in the devices 12 may be displayed.

It is to be noted that a device 12 and a chatbot as a conversation partner may be selected by designating a device 12 or a chatbot by voice without displaying the screen 62.

In the exemplary embodiment, multiple devices 12 (chatbots) are selected by a user, and the multiple chatbots exchange information with a user. It is to be noted that during the exchange of information between a user and a chatbot, the chatbot (device 12) as a conversation partner may be changed by the user.

Figure 8:
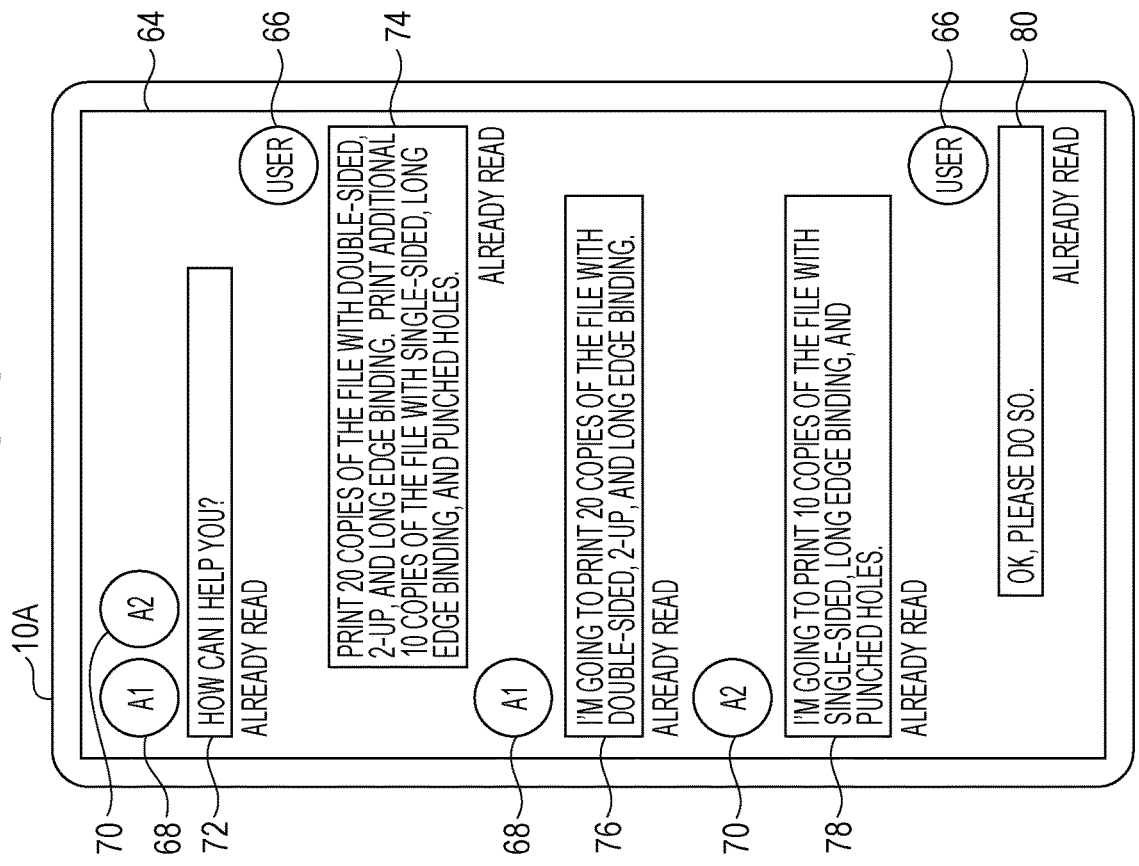
FIG. 8 is a view illustrating a screen.

Hereinafter, the screen for a user to interact with multiple chatbots will be described with reference to FIG. 8. FIG. 8 illustrates an example of the screen. When multiple devices 12 (multiple chatbots) are selected by a user, the controller 20 of the terminal apparatus 10A displays the screen 64 on the display of the UI unit 16, and displays various types of information on the screen 64. The screen 64 is a user interface (a conversational user interface) for a user to interact with multiple chatbots. In other words, the screen 64 is a user interface for exchanging messages between chatbots and a user. On the screen 64, information (for instance, a character string and an image) inputted to the terminal apparatus 10A by a user, and information (for instance, a character string, an image) indicating the content of an utterance of each chatbot are displayed. Conversation between the user and the chatbot is a so-called chat format conversation (specifically, a conversation format in which the user and the chatbot alternately talk to have a conversation). For instance, the content of an utterance of each of the user and the chatbot is displayed on the screen 64 along the time of utterance in the order of time series.

On a display area for a user, an image 66 (for instance, an icon or a photograph) associated with the user is displayed. On a display area for a chatbot, an image (for instance, an icon) is displayed, which is associated with a chatbot mounted in the device 12 selected by a user. Instead of the image or along with the image, a character string for identifying the user and a character string for identifying the chatbot may be displayed.

Here, it is assumed that multifunctional devices A1, A2 are selected by a user as the devices 12 for performing processing. In this case, chatbot A1 mounted in the multifunctional device A1 and chatbot A2 mounted in the multifunctional device A2 are selected as conversation partners of a user, and the controller 20 displays an image 68 associated with the chatbot A1 and an image 70 associated with the chatbot B1 on the screen 64. It is to be noted that the multifunctional device A1 corresponds to an example of a first device, and the multifunctional device A2 corresponds to an example of a second device. In addition, the chatbot A1 corresponds to an example of a first chatbot, and the chatbot A2 corresponds to an example of a second chatbot. It is to be noted that three or more devices 12 may be selected by a user. In this case, three or more chatbots selected operate as conversation partners of a user.

For instance, the terminal apparatus 10A transmits information indicating a connection request to each of the multifunctional devices A1, A2, thereby establishing communication between the terminal apparatus 10A, and the multifunctional devices A1, A2, and further between the multifunctional devices A1 and A2. In addition, the terminal apparatus 10A transmits information to the multifunctional devices A1, A2, the information indicating that the multifunctional devices A1, A2 have been selected as the devices 12 used for the processing. Due to the transmission of the information, the chatbot A1 recognizes that the multifunctional device A1, in which the chatbot A1 is mounted, has been selected as the device 12 used for the processing, a partner device 12 is the multifunctional device A2, and a user who is operating the terminal apparatus 10A is a conversation partner. The same goes the chatbot A2. In addition, information is transmitted and received between the multifunctional device A1 and A2, and thus the chatbots A1, A2 each recognize a partner chatbot.

As described above, the chatbots A1, A2 are recognized as conversation partners of a user, and a conversation is held between a user, and the chatbots A1, A2. The content of an utterance of a user is transmitted from the terminal apparatus 10A to the multifunctional devices A1, A2. The content of an utterance of the chatbot A1 is transmitted from the multifunctional device A1 to the terminal apparatus 10A and the multifunctional device A2. The content of an utterance of the chatbot A2 is transmitted from the multifunctional device A2 to the terminal apparatus 10A and the multifunctional device A1. In this manner, the content of the utterance of each of the chatbots A1, A2 is displayed on the screen 64, and the chatbots A1, A2 each analyze the content of the utterance of a user and the content of the utterance of the other chatbot to be able to generate an answer.

For instance, first, an utterance content 72 such as "How can I help you?" is displayed as the utterance contents of the chatbots A1, A2 on the screen 64 in association with the images 68, 70. In response to this, when a user inputs the content of an instruction for the multifunctional devices A1, A2 to the terminal apparatus 10A as an utterance content 74, the controller 20 displays the utterance content 74 on the screen 64 in association with the image 66. Here, execution of the following processing is given as the content of an instruction by a user: "printing 20 copies of a specific file with double-sided, 2 pages on each side, and long edge binding, and printing additional 10 copies of the file with single-sided, long edge binding, and punched holes".

The processing determiner 22 of the terminal apparatus 10A analyzes the utterance content indicating the instruction content, and divides the processing included in the instruction content into one or multiple individual processing modules (an independent processing module). The processing determiner 22 then refers to the single functional management table and the cooperative functional management table, identifies one or multiple devices 12 having functions needed to perform each individual processing, and assigns each individual processing to a corresponding one of the devices 12. It is to be noted that for the above-mentioned analysis, processing such as natural language processing is used. For instance, when the multifunctional device A1 has no hole making function (punch function), and the multifunctional device A2 has a punching function, the processing determiner 22 assigns individual processing not involving punch processing to the multifunctional device A1, and individual processing involving punch processing to the multifunctional device A2. Thus, the processing to generate 20 copies is assigned to the multifunctional device A1, and the processing to generate 10 copies is assigned to the multifunctional device A2. It is to be noted that even when the multifunctional device A2 is capable of performing the individual processing (the processing to generate 20 copies)

not involving punch processing, the individual processing not involving punch processing is assigned to the multifunctional device A1 because the processing is completed earlier by performing distributed processing.

When the individual processing is assigned to the multifunctional devices A1, A2 as described above, the processing determiner 22 transmits information indicating the content of the individual processing to the multifunctional devices A1, A2, in the above example, the processing determiner 22 transmits information indicating the processing to generate 20 copies to the multifunctional device A1, and information indicating the processing to generate 10 copies to multifunctional device A2.

The chatbots A1, A2, which have received information indicating the content of individual processing, jointly take charge of respective parts of the individual processing. Specifically, the chatbot A1 takes charge of the individual processing performable by the multifunctional device A1, and the chatbot A2 takes charge of the individual processing performable by the multifunctional device A2. Specifically the chatbot A1 controls execution of the individual processing assigned to the multifunctional device A1, and the chatbot A2 controls execution of the individual processing assigned to the multifunctional device A2.

The chatbots A1, A2, which have received information indicating the contents of individual processing, transmits a reply to the terminal apparatus 10A, the reply for confirming the individual processing assigned to the chatbots A1, A2. The content of the reply is displayed as utterance contents 76, 78 on the screen 64. For instance, the utterance content 76 is a message for confirming the individual processing assigned to the multifunctional device A1, and is displayed on the screen 64 in association with the image 68. The utterance content 78 is a message for confirming the individual processing assigned to the multifunctional device A2, and is displayed on the screen 64 in association with the image 70. It is to be noted that the information indicating the utterance contents 76, 78 corresponds to an example of information indicating a result of addressing the instruction content.

When a user approves execution of a cooperative function by an utterance content 80, the terminal apparatus 10A transmits information indicating the approval to the multifunctional devices A1, A2. After receiving the information, the chatbots A1, A2 control execution of the individual processing assigned to themselves. Specifically, the chatbot A1 controls the multifunctional device A1, thereby causing the multifunctional device A1 to perform the individual processing assigned to the multifunctional device A1. Similarly, the chatbot A2 controls the multifunctional device A2, thereby causing the multifunctional device A2 to perform the individual processing assigned to the multifunctional device A2. It is to be noted that even if approval is not given by a user, the multifunctional devices A1, A2 may perform the individual processing assigned to themselves.

When the content of an utterance of a chatbot is read by a user (for instance, when information indicating an utterance content of a chatbot is designated on the screen 64 by a user), information indicating that the utterance content has been read by a user (for instance, information indicating read already) may be displayed in association with the utterance content. Also, when the content of an utterance of a user is recognized by a chatbot, information indicating that the utterance content has been read by a chatbot (for instance, information indicating read already) may be displayed in association with the utterance content.

In the above example, processing is assigned to the multifunctional devices A1, A2 by the processing determiner 2 of the terminal apparatus 10A. However, processing may be assigned to the multifunctional devices A1, A2 by the respective processing determiners 34 of the multifunctional devices A1, A2. The processing performed by each processing determiner 34 may be achieved by the chatbot (operation assistant) mounted in each device 12. Hereinafter, the processing will be described.

First, the terminal apparatus 10A transmits information indicating the utterance content 74 to the multifunctional devices A1, A2. The chatbots A1, A2 each analyze the utterance content 74, and identifies the content of the processing given by a user. For the analysis, for instance, processing such as natural language processing is used.

The chatbot A1 (the processing determiner 34) refers to the single functional management table and the cooperative functional management table, and identifies the individual processing which is included in the processing given by a user and performable by the functions owned by the multifunctional device A1 in which the chatbot A1 is mounted. The same goes with the chatbot A2. In addition, the chatbot A1 transmits information to the chatbot A2, the information indicating the individual processing performable by the multifunctional device A1. The same goes with the chatbot A2. In this manner, the chatbots A1, A2 exchange information indicating the individual processing performable by the multifunctional devices in which the chatbots A1, A2 are mounted. In this manner, the chatbots A1, A2 may recognize the individual processing performable and the individual processing not performable by the multifunctional device in which a partner chatbot is mounted. In the example illustrated in FIG. 8, the chatbots A1, A2 may recognize that the multifunctional device A2 has functions for performing all processing included in the content of the processing given by a user, and the multifunctional device A1 has no function for punching holes. Therefore, the chatbots A1, A2 (processing determiners 34) assign processing involving punch processing (processing to generate 10 copies) to the multifunctional device A2, and assign processing not involving punch processing (processing to generate 20 copies) to the multifunctional device A1. When processing is assigned to the multifunctional devices A1, A2 in this manner, the chatbots A1, A2 transmit information indicating the utterance contents 76, 78 showing the processing to the terminal apparatus 10A. The utterance contents 76, 78 are displayed on the screen 64. When approval of execution is given by a user, the chatbots A1, A2 control the multifunctional devices A1, A2, thereby causing the multifunctional devices A1, A2 to perform the respective individual processing assigned to the multifunctional devices A1, A2.

According to the exemplary embodiment, a user interface for giving instructions to multiple conversation partners (for instance, multiple chatbots) is provided. In this manner, time and effort for giving instructions for instance, steps of work) is decreased, as compared with when an instruction is individually given to each conversation partner.

In the above example, the individual processing performable by the multifunctional devices A1, A2 is identified by referring to the single functional management table and the cooperative functional management table, and each individual processing is assigned to the multifunctional devices A1, A2. However, the individual processing may be assigned to the multifunctional devices A1, A2 by a different method.

For instance, the multifunctional device A1 stores a functional management table which only lists the functions owned by the multifunctional device A1. The functions owned by devices 12 other than the multifunctional device A1 are not registered in the functional management table. Similarly, the multifunctional device A2 stores a functional management table which only lists the functions owned by the multifunctional device A2.

The chatbot A1 (operation assistant A1) mounted in the multifunctional device A1 refers to the functional management table stored in the multifunctional device A1, thereby determining whether or not each individual processing included in the content of an instruction given by a user is performable by the multifunctional device A1. In other words, the chatbot A1 determines whether or not the multifunctional device A1 has functions for achieving each individual processing. The same goes with the multifunctional device A2. The chatbots A1, A2 transmit and receive information indicating a determination result, thereby recognizing the individual processing performable by a partner multifunctional device and the individual processing not performable by a partner multifunctional device out of multiple units of individual processing included in the content of the instruction. In other words, the chatbots A1, A2 are able to recognize what kind of individual processing is performable by a partner multifunctional device and what kind of individual processing is not performable by a partner multifunctional device. When the example illustrated in FIG. 8 is used for description, out of multiple units of individual processing included in the instruction content, the chatbot A1 recognizes that printing with double-sided, multiple pages on each side, and long edge binding is possible by the multifunctional device A1, but punch processing is not possible, and transmits information indicating these conditions to the chatbot A2. Also, the chatbot A2 recognizes that out of multiple units of individual processing, printing with single-sided, long edge binding, and punch processing is possible by the multifunctional device A2, and further recognizes that printing with multiple pages on both sides is possible, and transmits information indicating these conditions to the chatbot A1. In this manner, the chatbots A1, A2 are able to recognize the individual processing performable by a partner multifunctional device and the individual processing not performable by a partner multifunctional device. The chatbots A1, A2 then assign each individual processing to the multifunctional devices A1, A2 based on the recognition. Although the multifunctional device A1 is unable to perform punch processing, the multifunctional device A2 is able to perform punch processing, thus the chatbots A1, A2 assign individual processing (processing to generate 10 copies) including punch processing to the multifunctional device A2. Although the individual processing (the processing to generate 20 copies) not involving punch processing is performable by any one of the multifunctional devices A1, A2, the chatbots A1, A2 assign processing not involving punch processing to the multifunctional device A1 because the processing is completed earlier by distributing the individual processing over multiple multifunctional devices and performing the distributed processing.

The chatbots A1, A2 transmit information indicating result of the assignment to the terminal apparatus 10A. The controller 20 of the terminal apparatus 10A displays the information as the utterance contents 76, 78 of the chatbots A1, A2 on the screen 64. Each individual processing included in the instruction content is also assigned to each device 12 by such processing.

It is to be noted that another user may participate in the conversation between a user, and the chatbots A1, A2. In this case, an image associated with the another user is displayed on the screen 64, and the content of an utterance of the another user is displayed on the screen 64 in association with the image.

In addition, a user may give a message to a chatbot by voice or gesture. In this case, the screen 64 does not need to be displayed. Even when voice or gesture is used, the screen 64 may be displayed and the content of voice or the content of gesture may be displayed is a character string on the screen 64.

Also, the first device may perform first individual processing, and the second device may perform second individual processing on a result of the first individual processing. For instance, when multicolor additional printing is performed, the multifunctional device A1 may perform first printing (for instance, printing with a first color), and the multifunctional device A2 may perform second printing (for instance, printing with a second color) on a printed object obtained by the first printing. In this case, the processing determiner 22 or the chatbots A1, A2 assigns the first printing or the second printing to the multifunctional devices A1, A2, respectively to cause the multifunctional devices A1, A2 to perform multicolor additional printing. For instance, the order of printing may be determined by the performance or status of the multifunctional devices A1, A2. In the example illustrated in FIG. 8, the multifunctional device A1 may print 30 copies, and the multifunctional device A2 may perform hole making (punch processing) on 10 copies out of the 30 copies. It is to be noted that the same goes when three or more devices 12 are used.

When an interrupt processing request is made to a device 12, a chatbot mounted in the device 12 may address the request. For instance, the chatbot may cause the device 12 to perform the interrupt processing request first and perform other processing or may cause the device 12 to perform processing in accordance with the order in which execution instructions are given without giving a higher priority to the interrupt processing request.

Also, multiple chatbots with different settings may be mounted in the device 12, and a multiple personality chatbot in a figurative sense may be formed by the multiple chatbots. For instance, multiple chatbots with different settings of occupation, age, and sex may be mounted in the device 12. Each chatbot analyzes the content of an utterance of a user, and information indicating a reply of each chatbot to the utterance content or information indicating the majority of replies may be transmitted to the terminal apparatus 10A as the information indicating the content of an utterance of the chatbot. The content of the utterance is displayed on the terminal apparatus 10A. For instance, each chatbot analyzes the processing included in the content of an instruction given by a user, and may transmit to the terminal apparatus 10A information presented to a user for selecting devices 12 (such as devices 12 each individually determined by a chatbot or devices 12 determined by the majority of the chatbots) by which the individual processing is to be performed. The information is displayed as the utterance content of the chatbots on the terminal apparatus 10A. The processing is performed by the devices 12 selected by a user. It goes without saying that each chatbot may determine devices 12 by which the individual processing is to be performed, and may cause the determined devices 12 to perform the processing even when devices 12 are not selected by a user.

It is to be noted that the chatbots A1, A2 may be mounted in the terminal apparatus 10A or a server, and may operate as the chatbots for the multifunctional devices A1, A2.

Also, the processing determiner 22 or the chatbots A1, A2 may assign one or multiple units of individual processing to the multifunctional devices A1, A2 according to a completion time of the processing included in the content of the instruction given by a user. The chatbot A1 takes charge of control of the individual processing assigned to the multifunctional device A1 in which the chatbot A1 is mounted, and causes the multifunctional device A1 to perform the individual processing. The same goes with the chatbot A2.

For instance, the processing determiner 22 or the chatbots A1, A2 checks the performance and status of the multifunctional devices A1, A2, and assigns the individual processing to the multifunctional devices A1, A2 so that the processing included in the content of an instruction is completed earlier. For instance, the processing determiner 22 or the chatbots A1, A2 calculates (predicts) the completion time of the individual processing when each of the multifunctional devices A1, A2 performs the individual processing, based on the performance (such as the performance of a processor, the capacity of a memory), the status of the multifunctional devices A1, A2, and the content of the individual processing. The processing determiner 22 or the chatbots A1, A2 assigns the individual processing to the multifunctional devices A1, A2 so that the completion time of the individual processing attains a minimum. In this manner, the processing included in the content of the instruction may be completed earlier. Also, individual processing does not need to be assigned to a device 12 during an operation of other processing, a device 12 during failure, and a device 12 with the power supply off.

As another example, the processing determiner 22 or the chatbots A1, A2 may assign the individual processing to the multifunctional devices A1, A2 so that the difference between the number of units of individual processing, of which the chatbot A1 takes charge (in other words, the number of units of individual processing assigned to the multifunctional device A1) and the number of units of individual processing, of which the chatbot A2 takes charge (in other words, the number of units of individual processing assigned to the multifunctional device A2) becomes smaller. In this manner, the load of the multifunctional devices A1, A2 may be reduced. If the multifunctional devices A1, A2 have the same performance, the completion time of the processing is shortened. Also, weight processing may be applied to the multifunctional devices A1, A2 based on the performance and status of the multifunctional devices A1, A2. For instance, a multifunctional device having a higher performance may perform more individual processing. Also, a multifunctional device which is turned on but not performing processing may perform more individual processing than a multifunctional device while performing processing.

Also, the processing determiner 22 or the chatbots A1, A2 may assign one or multiple units of individual processing to the multifunctional devices A1, A2 according to the performance of the multifunctional devices A1, A2. For instance, even if the multifunctional devices A1, A2 have the same function, when the performance of the function of multifunctional device A1 is higher than that of the multifunctional device A2, the individual processing achieved by the function is assigned to the multifunctional device A1. For instance, when individual processing is printing, the individual processing is assigned to a multifunctional device having a higher resolution. Alternatively, the individual processing may be assigned to a multifunctional device based on the clock frequency of the processor, the capacity of the memory mounted in the multifunctional device, and the image forming capability. For instance, the processing included in the content of the instruction may be completed earlier, or resultant product (achieved product) having higher quality may be generated in consideration of the performance of the device 12. Alternatively, the individual processing may be assigned to a multifunctional device having a track record of successful execution of the individual processing in the past, or a multifunctional device having a greater number of such records. It goes without saying that the individual processing may be assigned to a multifunctional device in consideration of the statuses of the multifunctional devices A1, A2.

Also, the processing determiner 22 or the chatbots A1, A2 may assign one or multiple units of individual processing to the multifunctional devices A1, A2 according to the quality of processing results expected to be obtained by the multifunctional device A1 and the quality of processing results expected to be obtained by the multifunctional device A2. The quality is defined by, for instance, the accuracy of a finished product (for instance, a printed material) or the occurrence frequency of error. For instance, even if the multifunctional devices A1, A2 have the same function, when the accuracy of a finished product expected to be obtained using the function by the multifunctional device A1 is higher than the accuracy of a finished product expected to be obtained using the function by the multifunctional device A2, the individual processing achieved by the function is assigned to the multifunctional device A1. Also, when the occurrence frequency of failure of the multifunctional device A1 is lower than the occurrence frequency of failure of the multifunctional device A2, the individual processing is assigned to the multifunctional device A1. For instance, the failure is managed as records, and the occurrence frequency of failure is calculated based on the records. Processing results having higher quality are obtained by taking the quality of the processing results into consideration like this.

Also, a chatbot mounted in a device 12, to which individual processing is assigned, may predict the completion time of the individual processing of which the device 12 takes charge (the individual processing assigned to the device 12Y based on the performance, status of the device 12 and the content of the individual processing. Information indicating the predicted completion time is transmitted from the device 12 to the terminal apparatus 10A as the information indicating an utterance content of the chatbot. The controller 20 of the terminal apparatus 10A displays the information indicating the predicted completion time on the display of the UI unit 16 as an utterance content of the chatbot.

For instance, the chatbot A1 predicts the time (first predicted completion time) taken for completion of the individual processing assigned to the multifunctional device A1, and transmits information indicating the first predicted completion time to the terminal apparatus 10A. Similarly, the chatbot A2 predicts the time (second predicted completion time) taken for completion of the individual processing assigned to the multifunctional device A2, and transmits information indicating the second predicted completion time to the terminal apparatus 10A. The controller 20 of the terminal apparatus 10A displays the information indicating the first predicted completion time and the information indicating the second predicted completion time on the display of the UI unit 16.

For instance, as illustrated in FIG. 9, the controller 20 displays the information indicating the first predicted completion time as an utterance content 82 of the chatbot A1 on the screen 64 in association with the image 68, and displays the information indicating the second predicted completion time as an utterance content 84 of the chatbot A2 on the screen 64 in association with the image 70. In the example illustrated FIG. 9, the first predicted completion time and the second predicted completion time are separately displayed on the screen 64. In this manner, predicted times taken for completion of the individual processing may be separately presented to a user.

Also, when the individual processing assigned to the multifunctional device A1 is completed, the chatbot A1 transmits information indicating completion of the individual processing to the terminal apparatus 10A. The controller 20 of the terminal apparatus 10A displays the information as an utterance content 86 of the chatbot A1 on the screen 64 in association with the image 68. Similarly, when the individual processing assigned to the multifunctional device A2 is completed, the controller 20 displays the information as an utterance content 88 of the chatbot A2 on the screen 64 in association with the image 70. It is to be noted that the information indicated by the utterance contents 86, 88 corresponds to an example of information indicating a result of addressing the instruction content.

Also, when the difference between the first predicted completion time and the second predicted completion time is less than or equal to a threshold value, the controller 20 of the terminal apparatus 10A may display the first predicted completion time and the second predicted completion time on the screen 64 as the same message. For instance, as illustrated in FIG. 10, the controller 20 displays information indicating a predicted completion time as an utterance content 90 of the chatbots A1, A2 on the screen 64 in association with the images 68, 70. The predicted completion time displayed then may be the first predicted completion time or the second predicted completion time, may be the average of the first predicted completion time and the second predicted completion time, or may be an earlier or later predicted completion time. Like this, a predicted completion time may be singly displayed. In this manner, it is possible for a user to recognize the predicted completion time of the processing included in the content of the instruction by referring to a predicted completion time.

When the individual processing assigned to each of the multifunctional devices A1, A2 is completed, the controller 20 displays information indicating the completion as an utterance content 92 of the chatbots A1, A2 on the screen 64 in association with the images 68, 70.

Also, when the individual processing of which the chatbot A1 takes charge (the individual processing assigned to the multifunctional device A1) is completed, the individual processing of which the chatbot A2 takes charge (the individual processing assigned to the multifunctional device A2) is completed, and is notified of the completion, if the user does not perform checking work for the notification within a predetermined time, the controller 20 may control notification of information for prompting a user to perform checking work. In short, the controller 20 prompts a user to perform checking work.

For instance, it is assumed that the individual processing assigned to each of the multifunctional devices A1, A2 is completed. In this case, as illustrated in FIG. 11, information indicating completion of the individual processing assigned to the multifunctional device A1 is displayed as an utterance content 94 of the chatbot A1 on the screen 64 in association with the image 68. Similarly, information indicating completion of the individual processing assigned to the multifunctional device A2 is displayed as an utterance content 96 of the chatbot A2 on the screen 64 in association with the image 70.

If a user does not perform checking work within a predetermined time from when the last individual processing (for instance, the individual processing assigned to the multifunctional device A2) is completed or when the utterance content 96 is displayed on the screen 64, the controller 20 displays information for prompting a user to perform checking work as an utterance content 98 of the chatbots A1, A2 on the screen 64 in association with the images 68, 70.

The checking work is, for instance, an already-read operation for the content of an utterance of the chatbots A1, A2 (for instance, an operation to specify the content of an utterance of the chatbots A1, A2 by a user on the screen 64) or checking work specific to the processing included in the content of an instruction. For instance, when the processing included in the content of an instruction is printing, the specific checking work is to take out a printed material from a multifunctional device by a user. For instance, when a printed material remains in the output tray of the multifunctional device A1 or the multifunctional device A2, and the printed material is detected by a sensor the chatbots A1, A2 determine that checking work has not been performed by a user, and transmit information indicating a result of the determination to the terminal apparatus 10A. After receiving the information, the controller 20 of the terminal apparatus 10A displays information for prompting a user to perform checking work on the screen 64. For instance, checking work to be perform is defined for each type of processing, and information indicating the checking work of each processing is stored in the terminal apparatus 10 and the devices 12. The controller 20 or the chatbots A1, A2 refers to the information, thereby determining whether or not checking work corresponding to processing specified by a user has en performed. When a user does not perform checking work within the predetermined time, the controller 20 displays information for prompting a user to perform the checking work on the screen 64. Displaying the information for prompting a user to perform the checking work like this makes it possible to avoid or prevent forgetting of the checking work by the user.

Alternatively, the controller 20 may display information for prompting a user to perform checking work on the screen 64 regularly (for instance, every 5 minutes) until checking work is performed. When checking work is performed, the controller 20 stops displaying the information.

Along with or instead of display of the information for prompting a user to perform checking work, a message prompting a user to perform checking work may be outputted as voice from the terminal apparatus 10A. The same goes with other messages of the chatbots A1, A2. Also, a user may input a message to the terminal apparatus 10A by voice, the message indicating that checking work has been performed.

In the example illustrated in FIG. 8, processing is performed using multiple devices 12 of the same type (for instance, the multifunctional devices A1, A2). However, processing may be performed by multiple devices 12 of different types. Hereinafter, a description will be given using a specific example with reference to FIG. 12. FIG. 12 illustrates the screen 64. Here, it is assumed that the multifunctional device A1 and a robot B1 are selected by a user as the devices 12 for performing the processing included in the content of an instruction. A chatbot B1 (operation assistant B1) is mounted in the robot B1.

The controller 20 of the terminal apparatus 10A displays on the screen 64 the image 68 associated with the chatbot A1 and an image 100 associated with the chatbot B1, the chatbot A1 and the chatbot B1 being conversation partners of the user. Similarly to the example illustrated in FIG. 8, an utterance content 102 such as "How can I help you?" is displayed in association with the images 68, 100 on the screen 64. When the user inputs the content of an instruction to the terminal apparatus 10A by character input or voice input in response to the display, the controller 20 displays an utterance content 104 indicating the content of the instruction on the screen 64 in association with the image 66. The terminal apparatus 10A transmits information indicating the content of the instruction to the multifunctional device A1 and the robot B1.

The chatbot A1 (processing determiner 34) refers to the functional management table which only lists, for instance, the functions owned by the multifunctional device A1 and is stored in the multifunctional device A1, thereby identifying the individual processing performable and individual processing not performable by the functions owned by the multifunctional device A1 among multiple unit of individual processing included in the content of the instruction. The chatbot A1 then transmits information to the robot B1, the information indicating the individual processing performable and individual processing not performable by the functions owned by the multifunctional device A1. In this manner, it is possible for the chatbot B1 which is a partner of the chatbot A1 to recognize the individual processing performable and individual processing not performable owned by the functions of the multifunctional device A1. Similarly, the chatbot B1 (processing determiner 34) refers to the functional management table which only lists the functions owned by the robot B1 and is stored in the robot B1, thereby identifying the individual processing performable and individual processing not performable by the functions owned by the robot B1 among the multiple units of individual processing (identifying the functions owned by the robot B1 and the functions not owned by the robot B1). The chatbot B1 then transmits information to the multifunctional device A1, the information indicating the individual processing performable and individual processing not performable by the functions owned by the robot B1. In this manner, it is possible for the chatbot A1 which is a partner of the chatbot B1 to recognize the individual processing performable and individual processing not performable owned by the functions of the robot B1.

For instance, execution of the following processing (co-operative function) is given as the content of an instruction by a user: "printing 20 copies of a specific file with double-sided, 2 pages on each side, and long edge binding, and bringing the copies of the printed material to the user (the terminal apparatus 10A)".

It is assumed that the multifunctional device A1 has a function of printing with double-sided and 2 pages on each side but has no function of moving and transporting an object. On the other hand, it is assumed that the robot B1 has no printing function but has a function of moving and transporting an object. In this case, the chatbot A1 recognizes that it is possible to perform printing by the multifunctional device A1, but not possible to transport a printed material to a user. In addition, the chatbot B1 recognizes that it is not possible to perform the printing but possible to transport the printed material to a user. As described above the information indicating the individual processing performable and the individual processing not performable are transmitted and received between the multifunctional device A1 and the robot B1, thus it is possible for the chatbots A1 and B1 to share what has been recognized by both chatbots.

The chatbots A1, B1 then assigns the above-mentioned print processing to the multifunctional device A1, and assigns the above-mentioned processing to transport the printed material to a user (the terminal apparatus 10A) to the robot B1. It is to be noted that the position of each of the multifunctional device A1, the robot B1, and the terminal apparatus 10A may be identified, for instance by using a technique such as a global positioning system (GPS). Therefore, it is possible to identify the position of each of the multifunctional device A1, the robot B1, and the terminal apparatus 10A using the chatbots A1, B1, and the GPS technique.

The chatbots A1, B1 transmit information to the terminal apparatus 10A, the information indicating the individual processing assigned to the respective devices 12. The controller 20 of the terminal apparatus 10A displays information indicating the content of the individual processing assigned to the multifunctional device A1, as an utterance content 106 of the chatbot A1, in association with the image 68 on the screen 64, based on the information transmitted from the chatbot A1. Similarly, information indicating the content of the individual processing assigned to the robot B1 is displayed as an utterance content 108 of the chatbot A1 in association with the image 100 on the screen 64.

When a user instructs execution of processing by an utterance content 100, the multifunctional device A1 and the robot B1 perform the individual processing assigned to themselves.

As described above, even when an instruction is given to multiple devices 12 of different types, it is possible for the chatbot mounted in each device 12 to identify the individual processing performable by the device 12 in which the chatbot is mounted, to identify the individual processing performable by other devices 12, and to assign the individual processing to the devices 12.

It is to be noted that although the individual processing is assigned by the chatbots A1, B1 (the processing determiner 34), the individual processing may be assigned by the processing determiner 22 of the terminal apparatus 10A.

In the exemplary embodiment, the content of an instruction including the processing performable by multiple devices 12 selected by a user is given by the user. When the content of an instruction including the processing not performable by the multiple devices 12 is given by a user, the controller 20 may notify (display or output voice) the user that the content of the instruction is not performable. The processing will be described with reference to FIG. 13. FIG. 13 illustrates the screen 64. Here, it is assumed that the multifunctional device A1 and a camera C1 are selected by a user as the devices 12 for performing the processing included in the content of an instruction. A chatbot C1 (operation assistant C1) is mounted in the camera C1.

The controller 20 of the terminal apparatus 10A displays on the screen 64 the image 68 associated with the chatbot A1 and an image 112 associated with the chatbot C1, the chatbot A1 and the chatbot C1 being conversation partners of the user. Similarly to the example illustrated in FIG. 8, an utterance content 114 such as "How can I help you?" is displayed in association with the images 68, 112 on the screen 64. When the user inputs the content of an instruction to the terminal apparatus 10A by character input or voice input in response to the display, the controller 20 displays an utterance content 116 indicating the content of the instruction on the screen 64 in association with the image 66. The terminal apparatus 10A transmits information indicating the content of the instruction to the multifunctional device A1 and the camera C1.

Here, the content of the instruction including the request "I want to eat ramen, please cook one" is given by a user. When the multifunctional device A1 and the camera C1 do not have the function for implementing the request (for instance, when the function for implementing the request is not registered in the functional management table of each device 2), the chatbots A1, C1 transmit information to the terminal apparatus 10A, the information indicating that it is not possible to implement the request included in the content of the instruction. The controller 20 of the terminal apparatus 10A displays information indicating that it is not possible to implement the request, as an utterance content 118 of the chatbots A1, C1 in association with the images 68, 112 on the screen 64. When an utterance content 120 indicating that the user understands the displayed information is inputted to the terminal apparatus 10A, a series of conversations is completed.

(Modification)

Hereinafter, a modification will be described. In the modification, a list of candidates for combinations of devices 12 is displayed, the candidates being defined based on the compatibility between the devices 12. A user selects devices 12 from the list, by which the processing included in the content of the instruction is to be performed. Hereinafter, the modification will be described in detail.

FIG. 14 illustrates a compatibility management table according to the modification. In the compatibility management table according to the modification, information indicating a combination devices 12 and information indicating a compatibility level are associated with each other. The compatibility is pre-defined according to, for instance, the number of cooperative functions implementable by a combination of devices 12, the content of processing performable by the combination, the level of performance achieved by the combination, the level of quality of generated product (achieved product) when processing is performed by the combination, the status of each device 12, the manufacturer of each device 12, and/or the standard of each device 12. For instance, a higher compatibility level is associated with a combination having better compatibility. The data of the compatibility management table is stored in the terminal apparatus 10 and each device 12.

Figure 15:
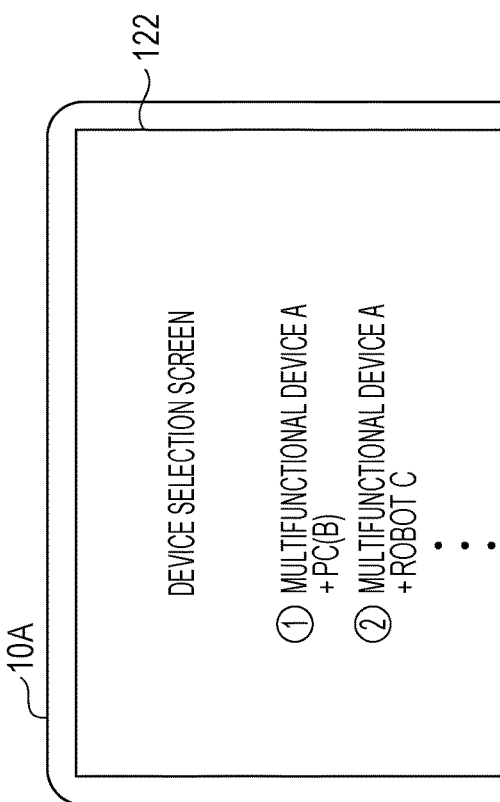
FIG. 15 is a view illustrating a screen.

FIG. 15 illustrates an example of a screen for selecting a device 12. The controller 20 of the terminal apparatus 10A displays a screen 122 on the display of the UI unit 16 in accordance with an instruction of a user, the screen 122 for selecting multiple devices 12 which perform processing. The controller 20 displays a list of combinations of devices 12 on the screen 122. In this case, the controller 20 displays combinations having better compatibility and combinations having bad compatibility on a priority basis based on the compatibility management table. For instance, the controller 20 displays the combinations having better compatibility above the combinations having bad compatibility in the list. For instance, the compatibility of the combination of the multifunctional device A and the PC (B) is better than the compatibility of the combination of the multifunctional device A and the robot C, thus the combination of the multifunctional device A and the PC (B) is displayed above the combination of the multifunctional device A and the robot C. This allows a user to easily select a combination of devices 12 having relatively better compatibility. It is to be noted that the controller 20 may display the performance and status of each device 12 on the screen 122 in association with each combination.

A user selects a combination of devices 12 from the list, by which the processing included in the content of the instruction is to be performed. The processing after the selection is the same as the processing according to the exemplary embodiment described above.

Alternatively, the controller 20 may display on the screen 122 candidates for combinations of devices 12, the candidates being defined based on the compatibility between the devices 12. For instance, the controller 20 may display on the screen 122 the candidates for combinations of devices 12 having a compatibility level higher than or equal to a threshold value, and may not display on the screen 122 the candidates for combinations of devices 12 having a compatibility level lower than the threshold value. This allows a user to easily select a combination of devices 12 having relatively better compatibility.

Figure 16:
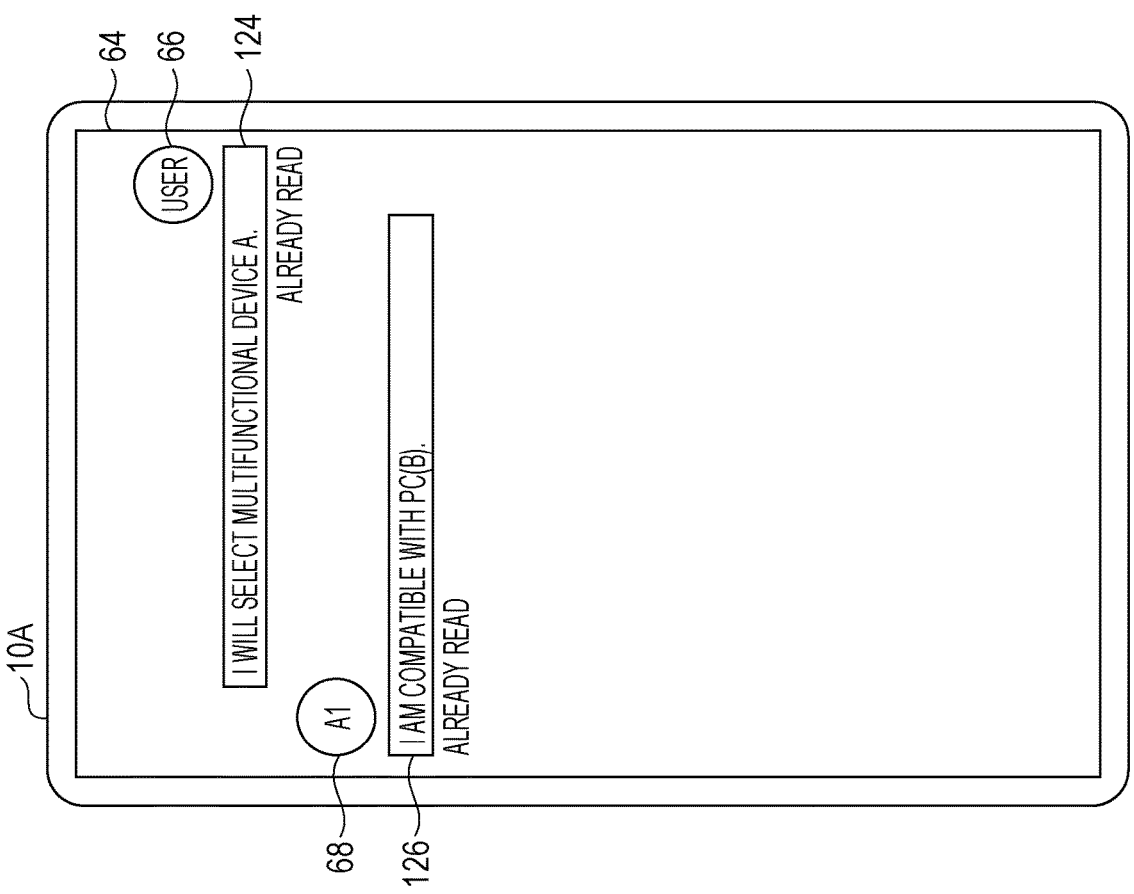
FIG. 16 is a view illustrating a screen.

As another example, when a user selects a device 12, other devices 12 having better compatibility with the device 12 may be recommended to the user. The processing will be described with reference to FIG. 16. FIG. 16 illustrates the screen 64. For instance, when a user operates the terminal apparatus 10A to select the multifunctional device A1, the terminal apparatus 10A transmits information to the multifunctional device A1, the information indicating that the multifunctional device A1 has been selected. Also, an utterance content 124 indicating that the multifunctional device A1 has been selected is displayed on the screen 64 in association with the image 66.

The chatbot A1 (controller 32) mounted in the multifunctional device A1 refers to the compatibility management table stored in the multifunctional device A1, thereby identifying another device 12 having better compatibility with the multifunctional device A1. For instance, the chatbot A1 identifies another device 12 having a compatibility level, with the multifunctional device A1, higher than or equal to a threshold value, and transmits device identification information of the another device 12 to the terminal apparatus 10A. The controller 20 of the terminal apparatus 10A displays information as an utterance content 126 of the chatbot A1 in association with the image 68 on the screen 64, the information including the device identification information of the another device 12. For instance, when the compatibility level between the multifunctional devices A1 and the PC (B) is higher than or equal to a threshold value, the PC (B) is recommended to a user as a device 12 having better compatibility with the multifunctional device A1. When multiple devices 12 having a compatibility level, with the multifunctional device A1, higher than or equal to a threshold value are identified, the multiple devices 12 are recommended to a user. It goes without saying that each device 12 having a compatibility level within a predetermined range from the highest level may be recommended. When a device 12 having a compatibility level, with the multifunctional device A1, higher than or equal to a threshold value is not identified, a device 12 having better compatibility with the multifunctional device A1 is not recommended.

Figure 17:
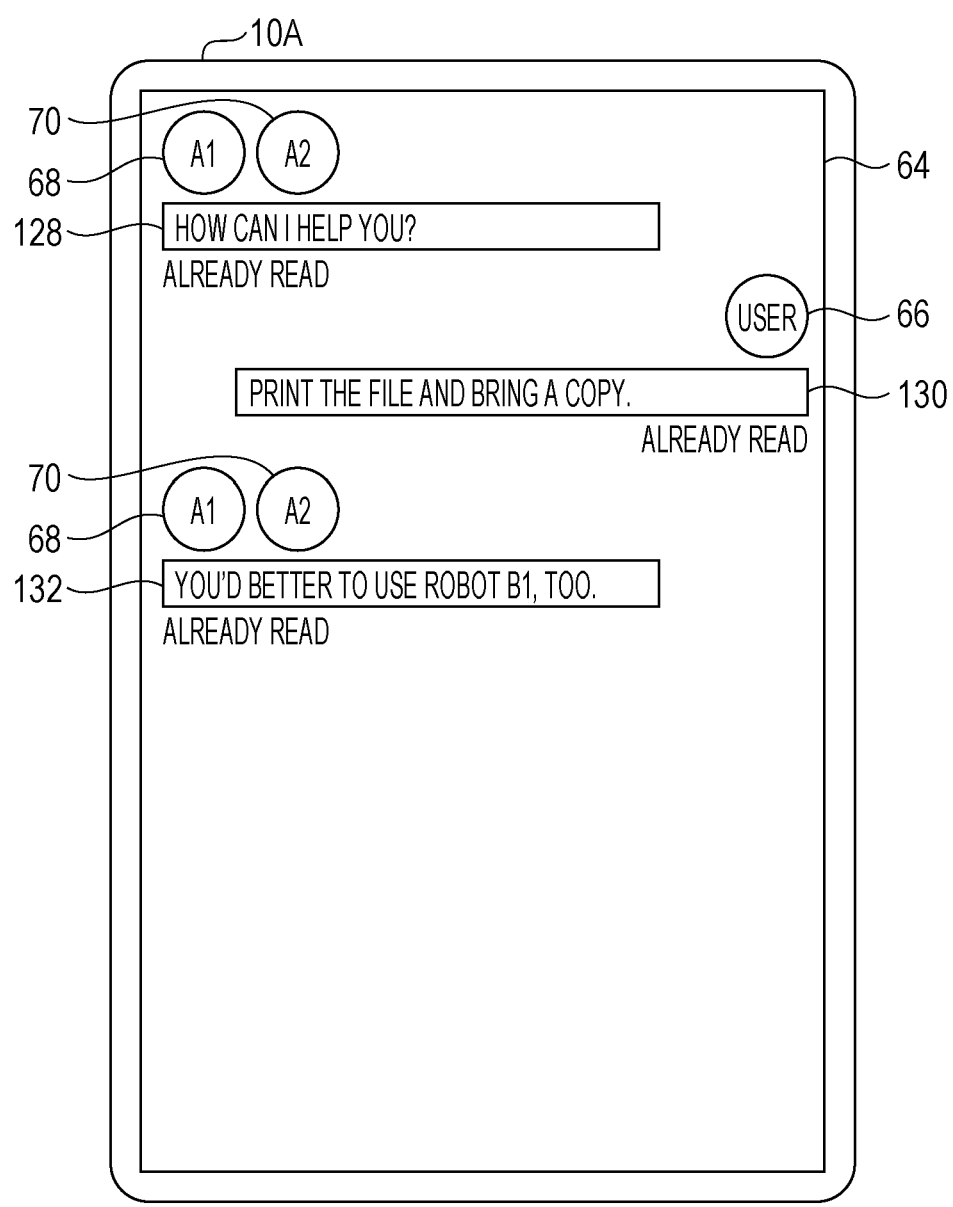
FIG. 17 is a view illustrating a screen.

As still another example, devices 12 needed to perform the processing included in instruction guide given by a user may be recommended (guided) to the user. The processing will be described with reference to FIG. 17. FIG. 17 illustrates the screen 64. Here, it is assumed that the multifunctional devices A1, A2 are selected by a user as the devices 12 for performing the processing included in the content of an instruction. The image 68 associated with the chatbot A1 and the image 70 associated with the chatbot A2 are displayed on the screen 64, an utterance content 128 to listen to the request of a user is displayed on the screen 64 in association with the images 68, 70.

For instance, it is assumed that execution of the following cooperative function is given as the content of an instruction by a user: "printing a specific file and bringing the printed material to the user". An utterance content 130 indicating the content of the instruction is displayed on the screen 64 in association with the image 66.

The chatbots A1, A2 (processing determiner 34) or the processing determiner 22 of the terminal apparatus 10A determines whether or not the multifunctional devices A1, A2 have functions for achieving each individual processing included in the content of the instruction. It is assumed that the multifunctional devices A1, A2 have a print function, but do not have a function of transporting a printed material to the user (terminal apparatus 10A). In this case, the chatbots A1, A2 or the processing determiner 22 refers to a single functional management table to identify the device 12 having a function of transporting a printed material. For instance, when the robot B1 has a function of transporting a printed material (for instance, when a transporting function is registered as one of the functions of the robot B1 in the single functional management table), the chatbots A1, A2 or the processing determiner 22 recommends a user to use the robot B1. In this case, information for recommending the use of the robot B1 is displayed as an utterance content 132 on the screen 64 in association with the images 68, 70. In this manner, when the devices 12 needed for the processing included in the content of the instruction given by a user are not selected by the user, it is possible to recommend the devices 12 to the user.

The chatbots A1, A2 or the processing determiner 22 may select the robot B1 as the device 12 needed for the processing. For instance, the chatbots A1, A2 or the processing determiner 22 transmits information indicating a connection request to the robot B1, and instructs the chatbot B1 (the chatbot mounted in the robot B1) to participate in the conversation with the user. This allows the user to have a conversation with the chatbot B1, and to instruct a device group including the robot B1 to perform the processing.

In the exemplary embodiment and the modification, a chatbot (operation assistant) is associated with each of the devices 12. However, a chatbot (operation assistant) may be associated with each component of a device 12. For instance, a chatbot for controlling the function of the main body of a multifunctional device may be associated with the main body, and a chatbot for controlling the function of the post processor of a multifunctional device may be associated with the post processor. The same goes with other devices 12. For instance, when the main body of a multifunctional device is selected by a user, a chatbot associated with the main body is selected as a conversation partner of the user. When a conversation is held between the chatbot and a user, the content of an instruction including processing utilizing the function of the main body is given by the user, and an instruction to execute the processing is given by the user, the processing is performed by the main body. On the screen 64, the image of the chatbot associated with the main body is displayed and the content of an utterance of the chatbot is displayed. Also, when multiple components (for instance, the main body of a multifunctional device and the display of a PC) are selected by a user, a chatbot associated with each component operates as a conversation partner of the user. For instance, a chatbot associated with the main body of a multifunctional device and a chatbot associated with the display of a PC operate as conversation partners of the user. Also when a chatbot associated with a component is used, similarly to the exemplary embodiment and the modification, the content of an instruction is given to one or multiple components by a user, and the processing included in the content of the instruction is performed by the one or multiple components.

In the exemplary embodiment and the modification, a chatbot is associated with a device 12. However, a chatbot may be associated with software. For instance, a chatbot may be associated with one or multiple pieces of software, and a user may have a conversation with the chatbot to instruct the one or multiple pieces of software associated with the chatbot to execute the processing. Also in this case, similarly to the conversation with the chat bot associated with the device 2, a user has a conversation on the screen 64 with the chatbot associated with software to gave the content of an instruction to the software.

As an example, each of the terminal apparatus 10 and the device 12 is implemented by cooperation between hardware and software. Specifically, each f the terminal apparatus 10 and the device 12 includes one or multiple processors such as CPUs which are not illustrated. The function of each component of the terminal apparatus 10 and the device 12 is implemented by the one or multiple processors reading and executing a program stored in a storage device which is not illustrated. The program is stored in a storage device through a recording medium such as a CD or a. DVD or through a communication path such as a network. As another example, each component of terminal apparatus 10 and the device 12 may be implemented by hardware resources such as a processor, an electronic circuit, and an application specific integrated circuit (ASIC), for instance. A device such as a memory may be utilized for the implementation. As still another example, each component of the terminal apparatus 10 and the device 12 may be implemented by a digital signal processor (DSP) or a field programmable gate array (FPGA).

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising
a processor programmed to:
when a user gives an instruction to a plurality of conversation partners in a conversational user interface, analyze the instruction to identify processing to be performed;
identify a plurality of devices for performing the identified processing, wherein
the plurality of conversation partners includes a first conversation partner that utters words to the user who has uttered and a second conversation partner that utters words to the user who has uttered,
the first conversation partner is associated with a first device that performs a first processing of the identified processing included in the instruction, and
the second conversation partner is associated with a second device that performs a second processing of the identified processing included in the instruction, the first device being different from the second device; and control notification of a result of addressing the instruction.

2. The information processing device according to claim 1,
wherein when the instruction is given by the user with a first image associated with the first conversation partner and a second image associated with the second conversation partner displayed in the user interface, the processor is programmed to control notification of the result of the addressing.

3. The information processing device according to claim 1,
wherein the processor is programmed to display a list of candidates for a device in the user interface, and the first device and the second device are devices selected from the list by the user.

4. The information processing device according to claim 1,
wherein the processor is programmed to display a list of candidates for combinations of devices in the user interface, the candidates being defined based on compatibility between the devices, and
the first device and the second device are a combination of devices selected from the list by the user.

5. The information processing device according to claim 1,
wherein the instruction includes one or a plurality of units of processing which are performable by cooperation between the first device and the second device.

6. The information processing device according to claim 1,
wherein the instruction includes one or a plurality of units of processing, and
the first conversation partner and the second conversation partner jointly take charge of respective parts of the one or plurality of units of processing included in the instruction.

7. The information processing device according to claim 6,
wherein the first conversation partner controls execution of processing which is in the instruction and performable by the first device, and
the second conversation partner controls execution of processing which is in the instruction and performable by the second device.

8. The information processing device according to claim 6,
wherein the first conversation partner and the second conversation partner jointly take charge of the respective parts of the one or plurality of units of processing included in the instruction so that a time taken for completion of the one or plurality of units of processing included in the instruction is reduced.

9. The information processing device according to claim 6,
wherein the first conversation partner and the second conversation partner jointly take charge of the respective parts of the one or plurality of types of processing included in the instruction so that a difference between the number of units of processing, of which the first conversation partner takes charge and the number of units of processing, of which the second conversation partner takes charge is reduced.

10. The information processing device according to claim 6,
wherein the first conversation partner and the second conversation partner jointly take charge of the respective parts of the one or plurality of units of processing included in the instruction according to performance of the first device and performance of the second device.

11. The information processing device according to claim 6,
wherein the first conversation partner and the second conversation partner jointly take charge of the respective parts of the one or plurality of units of processing included in the instruction according to quality of a processing result obtained by the first device and quality of a processing result obtained by the second device.

12. The information processing device according to claim 6,
wherein the processor is programmed to control notification of a first predicted completion time of the processing of which the first conversation partner takes charge, and notification of a second predicted completion time of the processing of which the second conversation partner takes charge.

13. The information processing device according to claim 12,
wherein the processor is programmed to provide notification of the first predicted completion time and the second predicted completion time separately.

14. The information processing device according to claim 12,
wherein when a difference between the first predicted completion time and the second predicted completion time is less than or equal to a threshold value, the processor is programmed to provide notification of the first predicted completion time and the second predicted completion time in a same message.

15. The information processing device according to claim 6,
wherein the processor is programmed to control notification of completion of the processing of which the first conversation partner takes charge and notification of completion of the processing of which the second conversation partner takes charge.

16. The information processing device according to claim 15,
wherein in a case where the user does not perform checking work within a predetermined time from when the user is notified of completion of the processing of which the first conversation partner takes charge and completion of the processing of which the second conversation partner takes charge, the processor is programmed to controls notification of information for prompting the user to perform checking work.

17. The information processing device according to claim 1,
wherein the first device and the second device are devices of a same type or devices of different types.

18. The information processing device according to claim 1,
wherein the first device is associated with a plurality of first conversation partners in which different settings are made, each of the plurality of first conversation partners being the first conversation partner.

19. The information processing device according to claim 1,
wherein when an instruction not performable by the first device and the second device is given by the user, the processor is programmed to control notification that the instruction is not performable.

20. The information processing device according to claim 1, wherein the first conversation partner is a first chatbot that automatically utters words to the user who has uttered, and the second conversation partner is a second chatbot that automatically utters words to the user who has uttered.

21. The information processing device according to claim 1, wherein the processor is programmed to provide notification of guidance of a device having a function of performing the instruction.

22. A non-transitory computer readable medium storing a program causing a computer to execute a process, the process comprising:

when a user gives an instruction to a plurality of conversation partners in a conversational user interface, analyzing the instruction to identify processing to be performed;

identifying a plurality of devices for performing the identified processing, wherein the plurality of conversation partners includes a first conversation partner that utters words to the user who has uttered and a second conversation partner that utters words to the user who has uttered, the first conversation partner is associated with a first device that performs a first processing of the identified processing included in the instruction, and the second conversation partner is associated with a second device that performs a second processing of the identified processing included in the instruction, the first device being different from the second device; and controlling notification of a result of addressing the instruction.

* * * * *